United States Patent
Paladugu et al.

(10) Patent No.: US 12,520,210 B2
(45) Date of Patent: **\*Jan. 6, 2026**

(54) CONDITIONAL PROCEDURES FOR ADDING AND/OR CHANGING A SECONDARY NODE (SN)

(71) Applicant: QUALCOMM Incorporated, San Diego, CA (US)

(72) Inventors: Karthika Paladugu, Hyderabad (IN); Ozcan Ozturk, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,149

(22) Filed: Apr. 1, 2024

(65) Prior Publication Data

US 2024/0276325 A1     Aug. 15, 2024

Related U.S. Application Data

(60) Continuation of application No. 18/472,090, filed on Sep. 21, 2023, which is a division of application No.
(Continued)

(51) Int. Cl.
*H04W 36/00* (2009.01)
*H04W 36/30* (2009.01)
(Continued)

(52) U.S. Cl.
CPC . *H04W 36/00837* (2018.08); *H04W 36/0079* (2018.08); *H04W 36/30* (2013.01);
(Continued)

(58) Field of Classification Search
None
See application file for complete search history.

(56) References Cited

U.S. PATENT DOCUMENTS 11,800,418 B2   10/2023   Paladugu et al.
2018/0279193 A1   9/2018   Park et al.
(Continued)

FOREIGN PATENT DOCUMENTS

CN     110290560 A    9/2019
WO    2012124991 A2   9/2012
(Continued)

OTHER PUBLICATIONS

Ericsson: "Configuration of Conditional Handover in NR", 3GPP Draft, 3GPP TSG RAN WG2 #107, R2-1909330, Configuration of Conditional Handover in NR, 3rd Generation Partnership Project (3GPP), Mobile Competence Centre, 650, Route Des Lucioles, F-06921 Sophia-Antipolis Cedex, F, vol. RAN WG2, No. Prague, Czech Republic, Aug. 26, 2019-Aug. 30, 2019 Aug. 15, 2019 (Aug. 15, 2019), XP051767132, 12 Pages, 1. Introduction, 2. Discussion, 2.1 CHO configuration.
(Continued)

*Primary Examiner* — Suhail Khan
(74) *Attorney, Agent, or Firm* — Patterson & Sheridan, LLP

(57) ABSTRACT

Aspects of the present disclosure relate to wireless communications, and more particularly, to procedures for supporting conditional new radio (NR) secondary node (SN) addition and change by reusing conditional handover (CHO) procedures. In some aspects, the procedures include a method for wireless communications by a master node (MN), comprising identifying a set of candidate cells for a conditional addition or change as an SN for a UE based on execution criteria, and signaling configuration information regarding the set of candidate cells to the UE.

20 Claims, 13 Drawing Sheets

Related U.S. Application Data

17/062,230, filed on Oct. 2, 2020, now Pat. No. 11,800,418.

(60) Provisional application No. 62/910,312, filed on Oct. 3, 2019.

(51) Int. Cl.
*H04W 36/32* (2009.01)
*H04W 56/00* (2009.01)
*H04W 74/0836* (2024.01)
*H04W 76/27* (2018.01)
*H04W 84/18* (2009.01)

(52) U.S. Cl.
CPC ....... *H04W 36/322* (2023.05); *H04W 36/328* (2023.05); *H04W 56/0045* (2013.01); *H04W 74/0836* (2024.01); *H04W 76/27* (2018.02); *H04W 84/18* (2013.01)

(56) References Cited

U.S. PATENT DOCUMENTS

| | | | |
|---|---|---|---|
| 2019/0246323 A1 | 8/2019 | Kim et al. | |
| 2019/0254101 A1 | 8/2019 | Lee et al. | |
| 2019/0261444 A1 | 8/2019 | Axmon et al. | |
| 2019/0342800 A1 | 11/2019 | Sirotkin et al. | |
| 2020/0229054 A1 | 7/2020 | Lee | |
| 2020/0396661 A1 | 12/2020 | Wu | |
| 2022/0038968 A1 | 2/2022 | Latheef et al. | |
| 2022/0141691 A1 | 5/2022 | Takahashi et al. | |
| 2022/0141904 A1 | 5/2022 | Yilmaz et al. | |
| 2022/0225203 A1* | 7/2022 | Hu | H04W 36/305 |
| 2024/0015617 A1 | 1/2024 | Paladugu et al. | |

FOREIGN PATENT DOCUMENTS

| | | |
|---|---|---|
| WO | 2016021821 A1 | 2/2016 |
| WO | 2019179350 A1 | 9/2019 |
| WO | 2020117118 A1 | 6/2020 |

OTHER PUBLICATIONS

International Preliminary Report on Patentability—PCT/US2020/054176—The International Bureau of WIPO—Geneva, Switzerland—Apr. 14, 2022.

International Search Report and Written Opinion—PCT/US2020/054176—ISA/EPO—Jan. 22, 2021.

\* cited by examiner

CONDITIONAL PROCEDURES FOR ADDING AND/OR CHANGING A SECONDARY NODE (SN)

CROSS-REFERENCE TO RELATED APPLICATION(s)

This application is a continuation of U.S. patent application Ser. No. 18/472,090, filed Sep. 21, 2023, which is a divisional of U.S. patent application Ser. No. 17/062,230, filed Oct. 2, 2020 (U.S. Pat. No. 11,800,418 as Granted Oct. 24, 2023), which claims benefit of and priority to U.S. Provisional Application No. 62/910,312, filed Oct. 3, 2019, which are hereby assigned to the assignee hereof and hereby expressly incorporated by reference herein in their entireties as if fully set forth below and for all applicable purposes.

BACKGROUND

Field of the Disclosure

Aspects of the present disclosure relate to wireless communications, and more particularly to procedures for supporting conditional new radio (NR) secondary node (SN) addition and change by reusing conditional handover (CHO) procedures.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNodeB (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is referred to as new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Certain aspects relate to a method for wireless communications by a master node (MN), comprising: identifying a set of candidate cells for a conditional addition or change as a secondary node (SN) for a UE based on execution criteria; and signaling configuration information regarding the set of candidate cells to the UE.

Certain aspects relate to an MN comprising a memory and a processor communicatively coupled to the memory. The processor and the memory are configured to identify a set of candidate cells for a conditional addition or change as a SN for a UE based on execution criteria; and signal configuration information regarding the set of candidate cells to the UE.

Certain aspects relate to an MN, comprising: means for identifying a set of candidate cells for a conditional addition or change as a SN for a UE based on execution criteria; and means for signaling configuration information regarding the set of candidate cells to the UE.

Certain aspects relate to a non-transitory computer-readable storage medium that stores instructions that when executed by a processor of an MN cause the MN to perform a method for handover, the method comprising: identifying a set of candidate cells for a conditional addition or change as an SN for a UE based on execution criteria; and signaling configuration information regarding the set of candidate cells to the UE.

Certain aspects relate to a method for wireless communications by a UE, comprising: receiving configuration information identifying a set of candidate cells for a conditional addition or change as an SN for a UE based on execution criteria; detecting the execution criteria is met for one of the candidate cells; and performing the conditional addition or change to the one of the candidate cells as the SN based on the detection.

Certain aspects relate to a UE comprising a memory, and a processor communicatively coupled to the memory. The memory and the processor are configured to, receive configuration information identifying a set of candidate cells for a conditional addition or change as an SN for a UE based on execution criteria. The memory and the processor are also configured to detect the execution criteria is met for one of the candidate cells. The memory and the processor are also configured to perform the conditional addition or change to the candidate cell as the SN based on the detection.

Certain aspects relate to a UE for wireless communications, comprising: means for receiving configuration information identifying a set of candidate cells for a conditional addition or change as an SN for a UE based on execution criteria; means for detecting the execution criteria is met for one of the candidate cells; and means for performing the conditional addition or change to the one of the candidate cells as the SN based on the detection.

Certain aspects relate to a non-transitory computer-readable storage medium that stores instructions that when executed by a processor of a UE cause the UE to perform a method for handover, the method comprising: receiving configuration information identifying a set of candidate cells for a conditional addition or change as an SN for a UE based on execution criteria; detecting the execution criteria is met for one of the candidate cells; and performing the conditional addition or change to the one of the candidate cells as the SN based on the detection.

Certain aspects relate to a method for wireless communications by an SN, comprising: receiving a request, from an MN, for the SN to be included as candidate for a conditional addition or change as an SN for a UE based on execution criteria; and sending an acknowledgement of the request to the MN.

Certain aspects relate to an SN comprising a memory, and a processor communicatively coupled to the memory. The processor and the memory are configured to receive a request, from an MN, for the SN to be included as candidate for a conditional addition or change as an SN for a UE based on execution criteria. The processor and the memory are also configured to send an acknowledgement of the request to the MN.

Certain aspects relate to an SN comprising: means for receiving a request, from an MN, for the SN to be included as candidate for a conditional addition or change as an SN for a UE based on execution criteria; and means for sending an acknowledgement of the request to the MN.

Certain aspects relate to a non-transitory computer-readable storage medium that stores instructions that when executed by a processor of an SN to cause the SN to perform a method for handover, the method comprising: receiving a request, from an MN, for the SN to be included as candidate for a conditional addition or change as an SN for a UE based on execution criteria; and sending an acknowledgement of the request to the MN.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
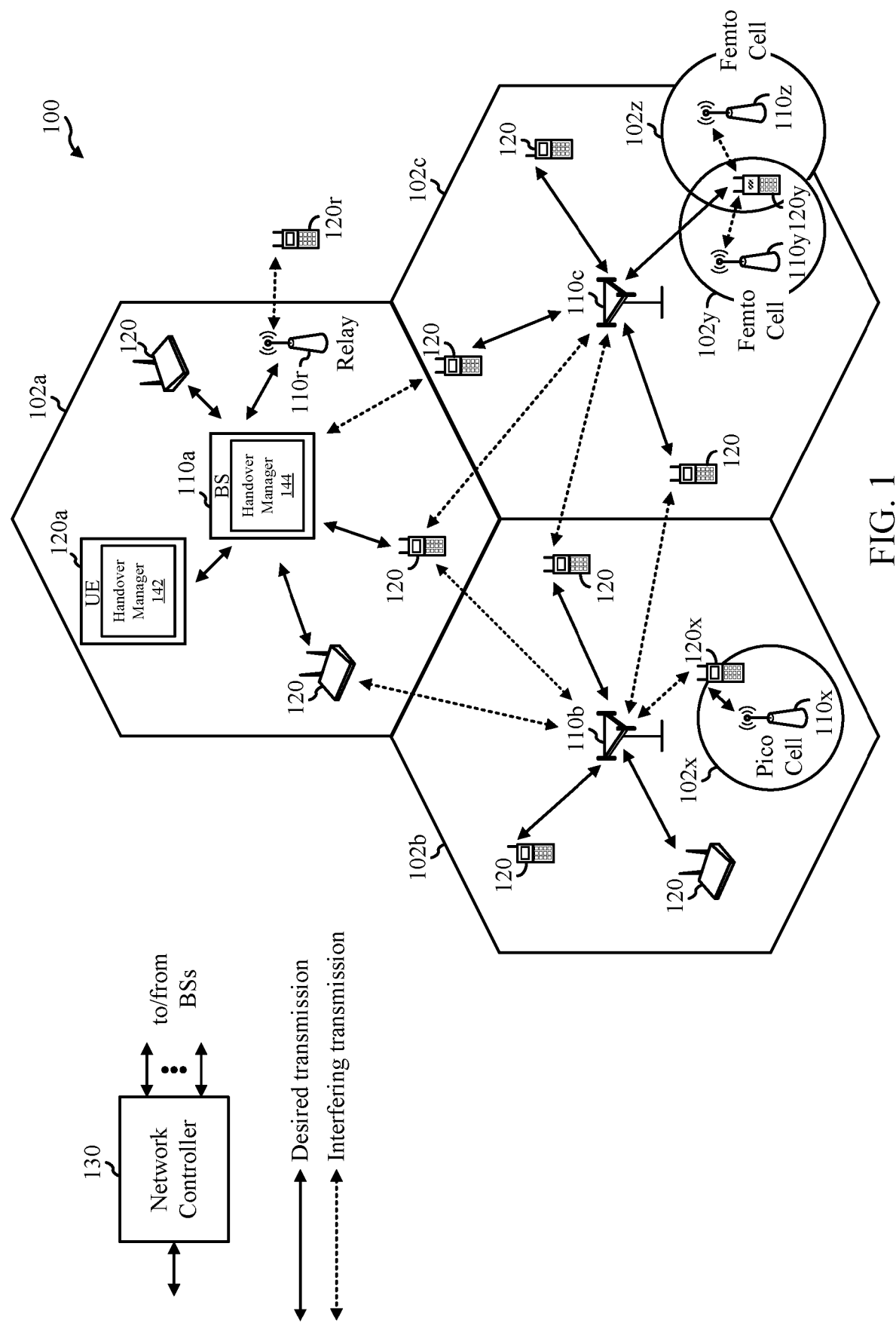
FIG. 1 is a block diagram conceptually illustrating an example telecommunications system, in accordance with certain aspects of the present disclosure.

Aspects of the present disclosure provide apparatus, methods, processing systems, and computer readable mediums for supporting conditional (e.g., new radio (NR)) secondary node (SN) addition and/or change by reusing aspects of a conditional handover (CHO) procedure.

Certain aspects of the present disclosure may be applied to new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless communication network 100 may be an NR system (e.g., a 5G NR network). For example, as shown in FIG. 1, a user equipment (UE) 120a includes a handover manager 142 that may be configured for receiving configuration information identifying a set of candidate cells for a conditional addition or change as a secondary node (SN) for a UE based on execution criteria. In some examples, the candidate cells may be primary SNs (PSCells) (or candidate PSCells), of a base station (BS) 110a to which the UE is currently connected. In other examples, the other SN may be an SN of another BS (e.g., BS 110b or BS 110y). The handover manager 142 may also be configured to detect whether the execution criteria is met for one of the candidate cells. If the execution criteria is met for one of the candidate cells, the handover manager 142 may also be configured to perform the conditional addition or change to the candidate cell as the SN based on the detection.

Similarly, the BS 110a has a handover manager 144 that may be configured for handover operations. For example, if the BS 110a acts as a master node (MN), the handover manager 144 may be configured to identify a set of candidate cells for a conditional addition or change as a SN for a UE based on execution criteria. The handover manager 144 may also be configured to signal configuration information regarding the set of candidate cells to the UE. In another example, if the BS 110a acts as a SN, the handover manager 144 may be configured to receive a request, from a MN, for the SN to be included as candidate for a conditional addition or change as an SN for a UE based on execution criteria. The handover manager 144 may also be configured to respond to the request from the MN by sending an acknowledgement of the request to the MN.

As illustrated in FIG. 1, the wireless network 100 may include a number of BSs 110 and other network entities. A BS may be a station that communicates with UEs 120. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal fast Fourier transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using time-division duplexing (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a central unit (CU) and a distributed unit (DU). A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit synchronization signaling (SS). NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
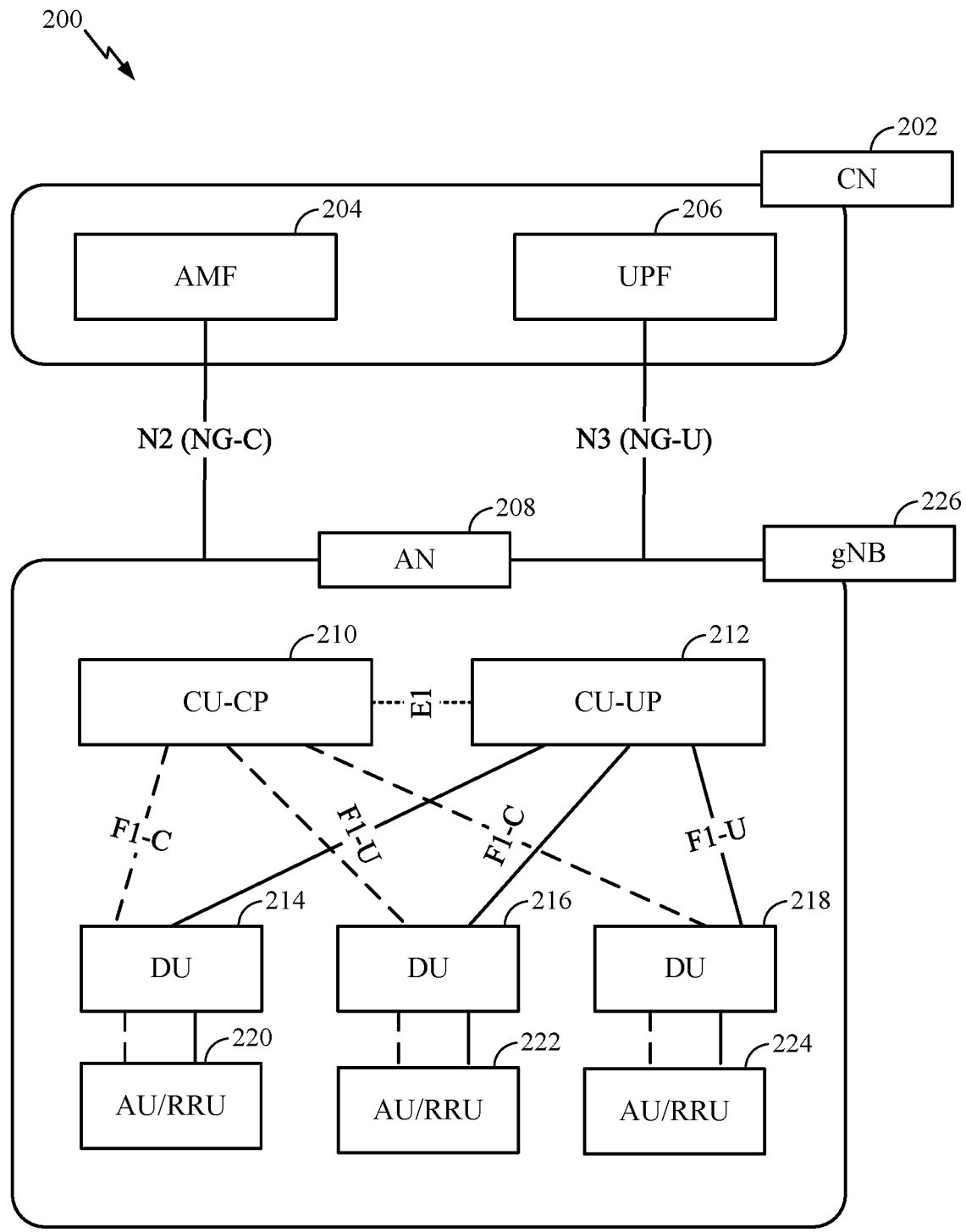
FIG. 2 is a block diagram illustrating an example architecture of a distributed radio access network (RAN), in accordance with certain aspects of the present disclosure.

FIG. 2 illustrates an example architecture of a distributed radio access network (RAN) 200, which may be implemented in the wireless communication network 100 illustrated in FIG. 1. As shown in FIG. 2, the distributed RAN includes core network (CN) 202 and access node 208 (e.g., BS 110a of FIG. 1).

The CN 202 may host core network functions. CN 202 may be centrally deployed. CN 202 functionality may be offloaded (e.g., to advanced wireless services (AWS)), in an effort to handle peak capacity. The CN 202 may include the Access and mobility management function (AMF) 204 and user plane function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more distributed units (DUs) 214-218, and one or more antenna/remote radio units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs/BSs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE 120a). The CU-UP(s) 212 may be connected to the CU-CP 210. For example, the DU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an edge node (EN), an edge unit (EU), a radio head (RH), a smart radio head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using bearer context management functions. Data forwarding between CU-UP(s) 212 may be via an Xn-U interface.

The distributed RAN 200 may support front-hauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common front-haul for LTE and NR. The distributed RAN 200 may enable cooperation between and among DUs 214-218, for example, via the CU-CP 212. An inter-DU interface may not be used.

Figure 3:
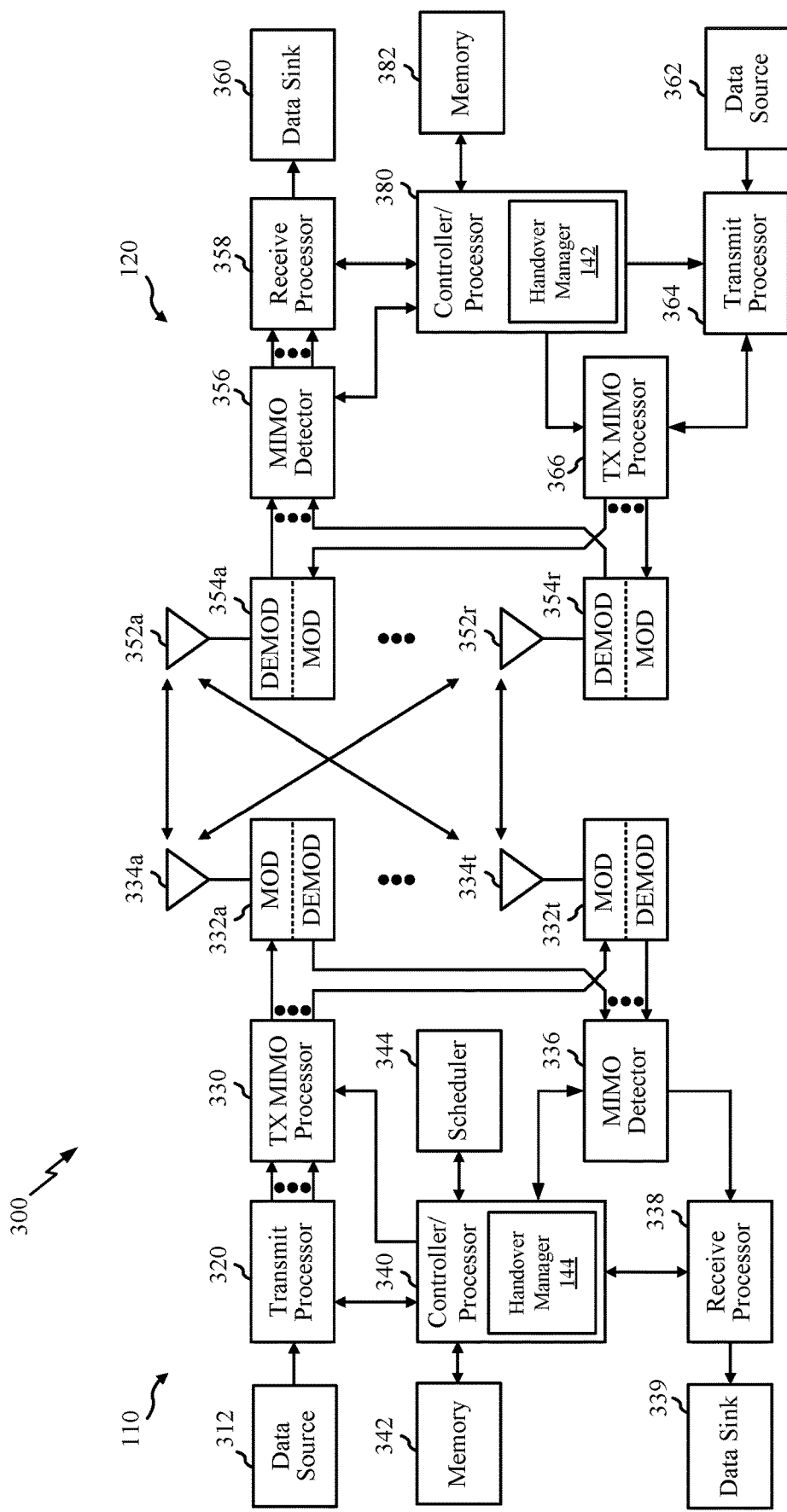
FIG. 3 is a block diagram conceptually illustrating a design of an example base station (BS) and user equipment (UE), in accordance with certain aspects of the present disclosure.

FIG. 3 shows a block diagram of a design of a BS 110 and a UE 120, which may be one of the BS and one of the UEs in FIG. 1. For a restricted association scenario, the BS 110 may be the macro BS 110c in FIG. 1, and the UE 120 may be the UE 120y. The BS 110 may also be BS of any other type illustrated in FIGS. 1 and 2, and the UE 120 may be a UE of any other type illustrated in FIG. 1. The BS 110 may be equipped with antennas 334a-334t, processors 320, 330, 338, and/or controller/processor 340 of the BS 110 may be used to perform the various techniques and methods described herein. For example, as shown in FIG. 3, the controller/processor 340 of the BS 110 includes a handover manager 144 that may be configured for SN handover operations. For example, if the BS 110 acts as a MN, the handover manager 144 may be configured to identify a set of candidate cells for a conditional addition or change as a SN for a UE based on execution criteria. The handover manager 144 may also be configured to signal configuration information regarding the set of candidate cells to the UE. In another example, if the BS 110 acts as a SN, the handover manager 144 may be configured to receive a request, from a MN, for the SN to be included as candidate for a conditional addition or change as an SN for a UE based on execution criteria. The handover manager 144 may also be configured to respond to the request from the MN by sending an acknowledgement of the request to the MN.

Similarly, the UE 120 includes a processor 380 that includes a handover manager 142 that may be configured for receiving configuration information identifying a set of candidate cells for a conditional addition or change as a secondary node (SN) for a UE based on execution criteria. The handover manager 142 may also be configured to detect whether the execution criteria is met for one of the candidate cells. If the execution criteria is met for one of the candidate cells, the handover manager 142 may also be configured to perform the conditional addition or change to the candidate cell as the SN based on the detection.

At the BS 110, a transmit processor 320 may receive data from a data source 312 and control information from a controller/processor 340. The control information may be for the physical broadcast channel (PBCH), physical control format indicator channel (PCFICH), physical hybrid automatic repeat request (HARQ), indicator channel (PHICH), physical downlink control channel (PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signaling (PSS), secondary synchronization signaling (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the BS 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the Physical Uplink Shared Channel (PUSCH)) from a data source 362 and control information (e.g., for the Physical Uplink Control Channel (PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the BS 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The memories 342 and 382 may store data and program codes for BS 110 and UE 120, respectively. A scheduler 344 may schedule UEs for data transmission on the downlink and/or uplink. The processor 340 and/or other processors and modules at the BS 110 may perform or direct, e.g., the execution of various processes for the techniques described herein, e.g., the execution of the functional blocks illustrated in FIGS. 7 and 9. The processor 380 and/or other processors and modules at the UE 120 may also perform or direct, e.g., the execution of the functional blocks illustrated in FIG. 8.

Example Handover Scenarios

Some techniques and apparatuses described herein provide for low-latency or zero-latency handover from a source BS to a target base station (e.g., in a network such as a 4G/LTE or 5G/NR network). For example, some techniques and apparatuses described herein provide for configuration of the handover using a first protocol stack of the UE and a second protocol stack of the UE, wherein the first protocol stack is used for communication with the first BS and the second protocol stack is used for communication with the second BS. The use of the two protocol stacks may enable configuration of handover with regard to the target BS to be performed while communication with the source BS is ongoing. Thus, a latency associated with handing over the UE from the source base station to the target base station is reduced. Furthermore, some techniques and apparatuses described herein may provide for buffering and backhauling of UE traffic between the source BS and the target BS so that a flow of traffic to the UE is not interrupted (or so that interruption is reduced or minimized), thereby further reducing latency associated with handing over the UE. In this way, service levels at the UE may be satisfied in the case of handover of the UE, which allows for satisfaction of performance requirements for certain types of traffic (e.g., gaming traffic, multimedia traffic, high-reliability traffic, low-latency traffic, etc.).

Furthermore, some techniques and apparatuses described herein may provide a common packet data convergence protocol (PDCP) function for the make-before-break (MBB) handover procedure, which may streamline security key management, ciphering/deciphering, integrity protection, integrity verification, data unit reordering/duplicate discarding, link selection logic, and/or the like. Some techniques and apparatuses described herein provide control-plane (e.g., BS, network controller, control entity, etc.) messaging and handling to support the MBB handover. Some techniques and apparatuses described herein provide for an MBB handover using a carrier aggregation (CA) multiple-input multiple-output (MIMO) technique, wherein a diminished MIMO configuration is signaled to cause at least one antenna to be available for use for the MBB handover. Still further, some techniques and apparatuses described herein provide a role switch-based MBB handover technique, wherein a master cell group of the UE is switched from the source base station to the target base station while connections with the source base station and the target base station are active. In this way, low-latency or zero-latency handover (and the benefits described above in connection with low-latency or zero-latency handover) are realized.

Figure 4:
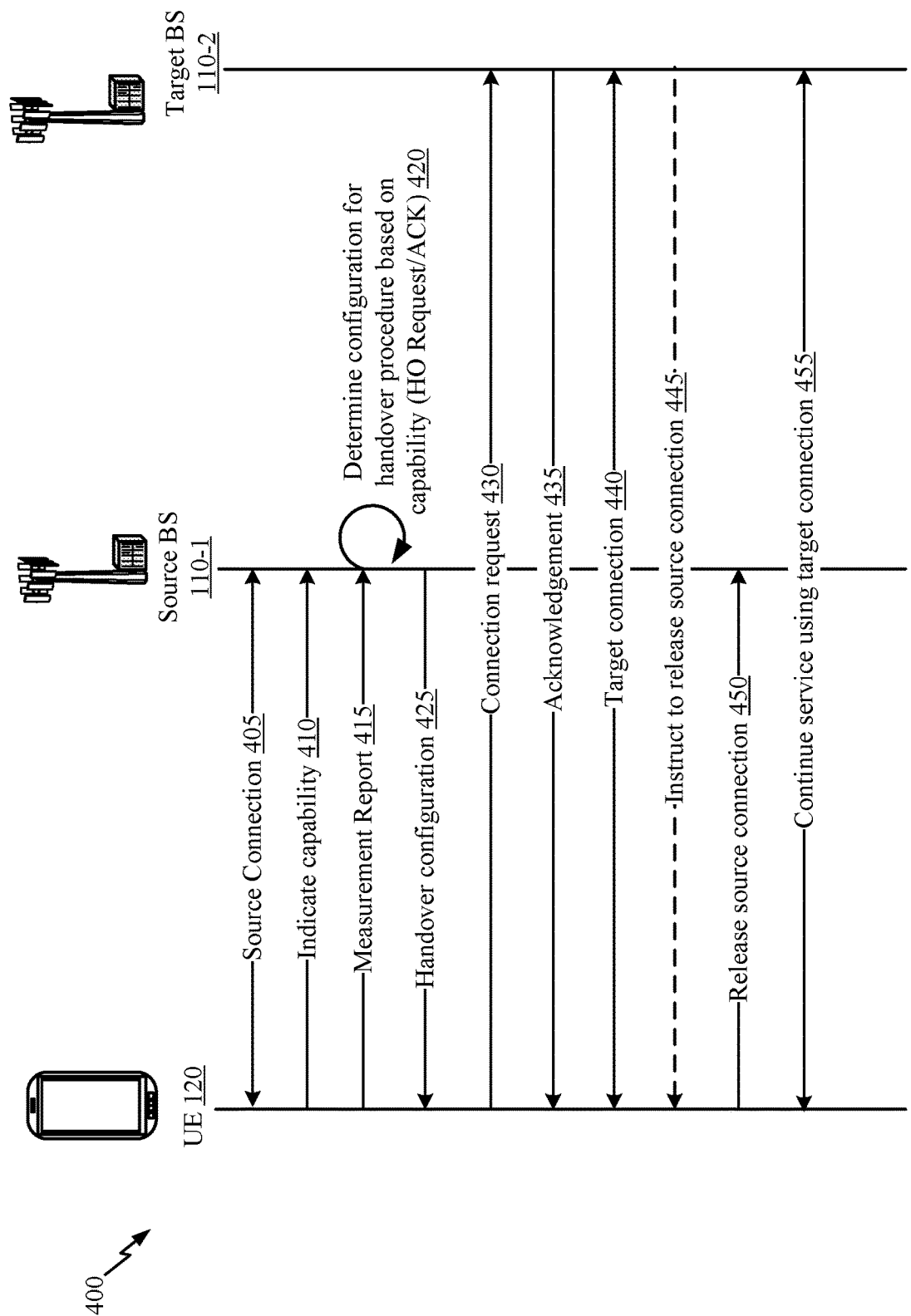
FIGS. 4 and 5 are call-flow diagrams illustrating examples of determining a handover configuration for a handover procedure of a radio access network, in accordance with certain aspects of the present disclosure.

FIG. 4 is a call-flow diagram illustrating an example 400 of determining a handover configuration for a handover procedure of a radio access network, in accordance with various aspects of the present disclosure. As shown in FIG. 4, UE 120 is handed over from a source BS 110-1 to a target BS 110-2. The UE 120 may be implemented by any UE of FIG. 1 (e.g., UE 120a), and source BS 110-1 and target BS 110-2 may be implemented by any BS 110 of FIG. 1 (e.g., BS 110a) or FIG. 2 (e.g., AN 208), a DU 214-218 of FIG. 4, or a TRP hosted by a DU 214-218 of FIG. 4. The handover described in connection with FIG. 4 may be intra-frequency or inter-frequency and/or may be intra-CU or inter-CU.

As shown in FIG. 4, at a first communication 405, UE 120 may establish a wireless communication connection with the source BS 110-1 (hereinafter referred to as a source connection). At a second communication 410, the UE 120 may indicate a capability of UE 120 to any one or more of source BS 110-1, target BS 110-2, or another a network entity such as an AMF (e.g., AMF 204 of FIG. 2), UPF (e.g., UPF 206 of FIG. 2), or any other CN function. For example, in the second communication 410, the UE 120 may indicate that UE 120 has a simultaneous transmit and receive capability and/or a dual connectivity capability.

In a third communication 415, UE 120 may provide a measurement report to source BS 110-1. The measurement report may be generated by the UE 120, and may indicate to the source BS 110-1 that a handover is to be performed from the source BS 110-1 to the target BS 110-2. For example, the UE 120 may perform cell quality measurements (e.g., L3 cell quality measurements) to assess the quality of radio links between the UE 120 and one or more of the source BS 110-1 and the target BS 110-2. Accordingly, the measurement report may include the results of the cell quality measurements. In some examples, if the quality of the radio link between the UE 120 and the source BS 110-1 is sufficient to allow for successful uplink communication of the measurement report, then successful receipt of the measurement report at the source BS 110-1 may indicate to the source BS 110-1 that a handover is to be performed from the source BS 110-1 to the target BS 110-2.

At step 420 (assuming successful receipt of the measurement report of the third communication 415), the source BS 110-1 may determine a configuration for a handover procedure based at least in part on the capability indicated in the second communication 410. For example, source BS 110-1 may provide a handover request to target BS 110-2, and may receive a handover acknowledgment (ACK) from target BS 110-2. In some aspects, source BS 110-1 may communicate with target BS 110-2 to determine a handover configuration for UE 120.

In a fourth communication 425, the source BS 110-1 may provide the configuration for the handover procedure to the UE 120. For example, the handover configuration may include a configuration for a handover procedure that utilizes or does not utilize the indicated capability of the UE 120. In some aspects, the handover configuration may indicate that a make-before-break (MBB) handover procedure and/or a DC-based MBB handover procedure be performed. Thus, the configuration may indicate to the UE 120 whether to maintain the radio link connection to the source BS 110-1 while, and/or after, a radio link connection to the target BS 110-2 is established.

In a fifth communication 430, UE 120 requests to connect with target BS 110-2 (e.g., using the configuration received from source BS 110-1). For example, UE 120 may perform a random access procedure to establish a connection with target BS 110-2 (hereinafter referred to as a target connection).

In response, the target BS 110-2 may reply with an acknowledgment in a sixth communication 435. The UE 120 and target BS 110-2 may then establish the target connection 440. As is evident in the example 400 illustrated in FIG. 4, UE 120 may concurrently maintain both a source connection with source BS 110-1 and target BS 110-2 during the handover process. In such cases, because UE 120 maintains an active connection with both source BS 110-1 and target BS 110-2 for a period of time, UE 120 may experience decreased delays relative to previous techniques and/or minimal data interruption time (e.g., 0 ms handover).

In a seventh communication 445, the target BS 110-2 may instruct the UE 120 to release the source connection between the UE 120 and the source BS 110-1 to complete the handover. For example, once the UE 120 and/or target BS 110-2 determines that the target connection is sufficiently strong (e.g., a communication parameter measured by the UE 120 and/or target BS 110-2 satisfies a first threshold indicative of a strong connection), target BS 110-2 may send the instruction to complete the handover.

In some aspects, the release of the source connection may not be based on an instruction from target BS 110-2. Instead, the UE 120 may release the source connection without instruction from target BS 110-2 based at least in part on the establishment of the target connection (e.g., the UE 120 determines that the communication parameter measured by the UE 120 satisfies the first threshold indicative of a strong target connection). In some aspects, the UE 120 may release the source connection based on an instruction from the source BS 110-1. In such an example, the instruction may be based at least in part on receiving, by the source BS 110-1, an indication of establishment of the target connection from the target BS 110-2 or from the UE 120.

In an eighth communication 450, the UE 120 may release the source connection to source BS 110-1. Additional communications 455 between the UE 120 and the target BS 110-2 may be made using the target connection.

Accordingly, as shown by example 400 in FIG. 4, a UE may provide a capability to a BS or network entity and the BS may configure an MBB handover procedure for the UE to enable the UE to use the capability during the handover procedure. Therefore, a UE may achieve enhanced performance during a handover procedure and may experience minimal mobility interruption time (e.g., via a 0 ms handover) relative to a handover procedure that does not account for, or take advantage of, the MBB capability of the UE. As indicated above, FIG. 4 is provided as an example. Other examples may differ from what is described with respect to FIG. 4.

Figure 5:
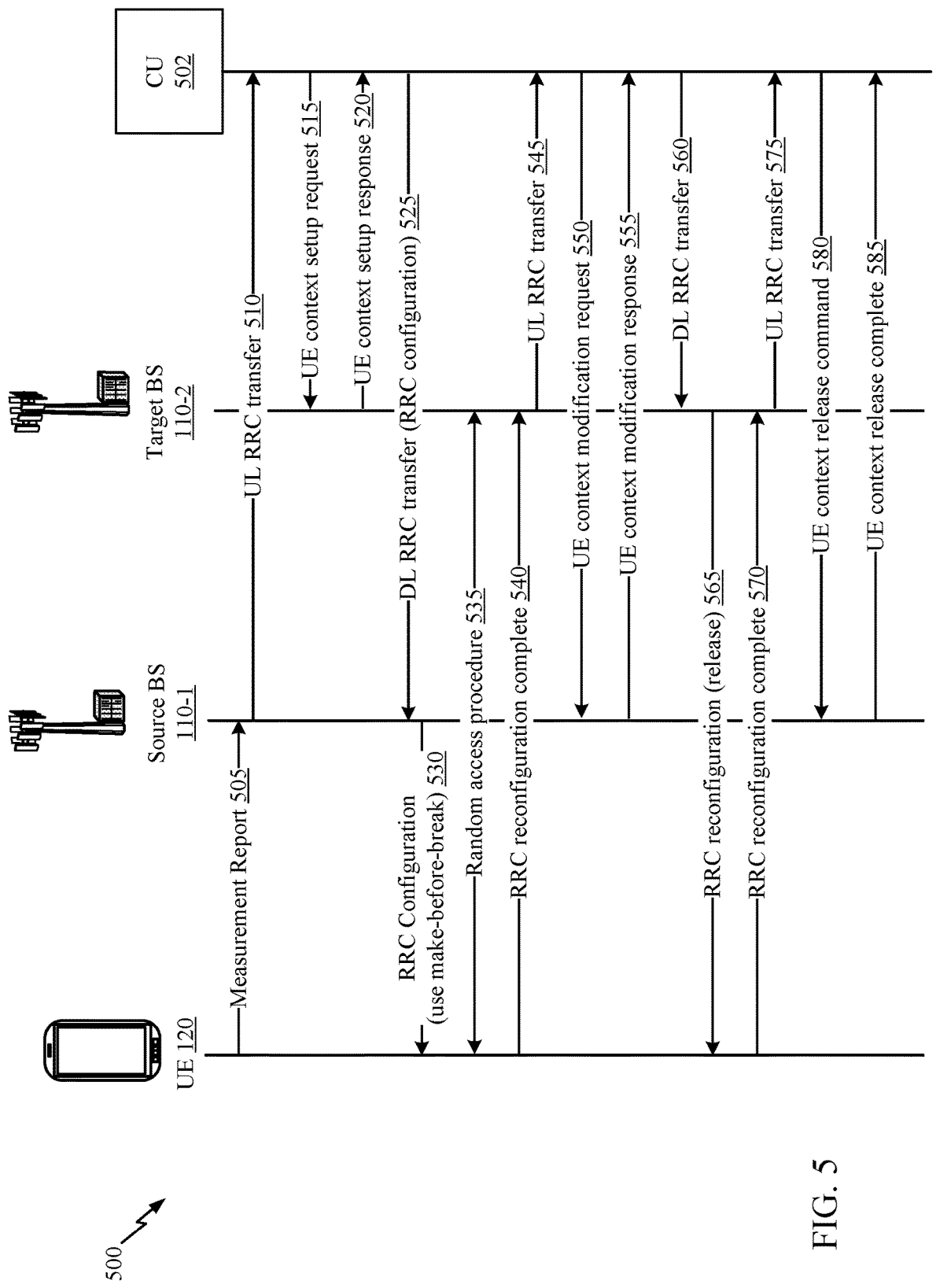

FIG. 5 is a call-flow diagram illustrating an example 500 of determining a handover configuration for a handover procedure of a RAN, in accordance with various aspects of the present disclosure. More particularly, FIG. 5 illustrates an example intra-CU handover procedure using an enhanced MBB handover in which both a source BS 110-1 and a target BS 110-2 are associated with a same CU 502.

Prior to the beginning of the call flow, the UE 120 may exchange user data (e.g., uplink user data from the UE 120 over PUSCH, and/or downlink user data over received by the UE over PDSCH) with the CU 502 via source BS 110-1. In a first communication 505, the UE 120 may transmit a measurement report to the source BS 110-1.

The generation and transmission of the measurement report of FIG. 5 may include features of the measurement report described in FIG. 4. In some aspects, the UE 120 may generate and transmit the measurement report based at least in part on an event trigger (e.g., a signal measurement that satisfies a threshold) associated with determining that a handover procedure is to be initiated. For example, the execution criteria for conditional SN addition may involve inter-RAT measurement events configured to indicate whether one or more of: (i) a measured signal quality value of at least one inter-RAT neighbor is greater than a first threshold value (e.g., the signal is sufficiently strong), or (ii) a measured signal quality value of a PCell is less than the first threshold value, and the measured signal quality value of the at least one inter-RAT neighbor (e.g., another BS or PCell at the current BS) is greater than a second threshold value.

In some examples, the UE 120 includes a simultaneous transmit and receive capability (e.g., MBB capability) that allows UE 120 to concurrently transmit and receive data and/or information during a handover. In such a case, UE 120 may establish and maintain a plurality of connections with a plurality of different BSs (e.g., with source BS 110-1 and target BS 110-2).

In a second communication 510, source BS 110-1 may send an uplink (UL) radio resource control (RRC) transfer to CU 502. In some aspects, the UL RRC transfer may include the measurement report. In an additional aspect, the UL RRC transfer may cause CU 502 to determine a handover configuration that is to be used for a handover procedure for UE 120. For example, CU 502 may select from possible handover procedures that may be performed by UE 120 based at least in part on the indicated capability of UE 120. In some aspects, CU 502 may select an enhanced MBB handover procedure for UE 120 based at least in part on the UE's 120 indication of a simultaneous transmit and receive capability.

In a third communication 515, the CU 502 may transmit a UE context setup request to target BS 110-2. In some examples, the CU 502 may transmit the UE context setup request, in part, to indicate to target BS 110-2 that UE 120 will be handed over to target BS 110-2 during a handover procedure.

In a fourth communication 520, target BS 110-2 may respond to the third communication 515 by transmitting a UE context setup response. The target BS 110-2 may send the UE context setup response to acknowledge the third communication 515 and/or to indicate an ability to support the handover procedure and to serve the UE 120 after the handover procedure.

In a fifth communication 525, the CU 502 may transmit a downlink (DL) RRC transfer to the source BS 110-1 in response to receiving the fourth communication 520. In some aspects, the DL RRC transfer may include an RRC reconfiguration message that indicates a configuration for a handover procedure in which UE 120 is to be handed over from source BS 110-1 to target BS 110-2.

In a sixth communication 530, the source BS 110-1 sends an RRC reconfiguration to UE 120 in response to receiving the fifth communication 525. In some aspects, the RRC reconfiguration can include information identifying target BS 110-2, information identifying a handover configuration, and/or any other suitable information. In some examples, the RRC reconfiguration may include information indicating that the UE 120 is to perform an enhanced MBB handover procedure with target BS 110-2 using a simultaneous transmit and receive capability of UE 120. In such a case, the UE 120 may determine that it is capable of maintaining a connection with source BS 110-1 while establishing a connection with target BS 110-2.

In a seventh communication 535, the UE 120 may perform a random access procedure with target BS 110-2 (e.g., to initiate and/or to establish a connection with target BS 110-2). In some aspects, UE 120 may continue to exchange user data (e.g., uplink user data and/or downlink user data) with CU 502 via source BS 110-1 during and after the random access procedure.

In an eighth communication 540, UE 120 transmits an RRC reconfiguration complete message to target BS 110-2. In some aspects, UE 120 may use a dual protocol stack, which includes a source protocol stack for communicating with source BS 110-1 and a target protocol stack for communicating with target BS 110-2. Each of these protocol stacks may include a packet data convergence protocol (PDCP) layer, a radio link control (RLC) layer, a medium access control (MAC) layer, and/or a physical (PHY) layer. In some aspects, the source protocol stack and the target protocol stack may share one or more layers, such as a common PDCP layer or entity. In some aspects, the UE 120 may use the target protocol stack for uplink data transmissions.

In a ninth communication 545, target BS 110-2 may transmit a UL RRC transfer to CU 502 in response to the eighth communication 540. In some examples, the UL RRC transfer may indicate the RRC reconfiguration is complete. Accordingly, in some aspects, based at least in part on receiving the indication that the RRC reconfiguration is complete, CU 502 may determine a handover completion configuration. For example, when making a completion determination, CU 502 may utilize and/or configure one or more thresholds for one or more measurement parameters to perform a handover completion procedure (e.g., to release source BS 110-1). Furthermore, in some aspects, after the RRC reconfiguration is complete, UE 120 may perform uplink user/control plane duplication with source BS 110-1 and CU 502. For example, control plane data may be duplicated and shared between BS 110-1 and CU 502. Furthermore, in some aspects, after the CU 502 determines the RRC reconfiguration is complete, the CU 502 may send downlink user data to the UE 120 via target BS 110-2, while also continuing to send downlink user/control plane duplication to the UE 120 via source BS 110-1. Accordingly, UE 120 may achieve improved reliability when receiving the data on the downlink.

In a tenth communication 550, the CU 502 transmits a UE context modification request to the source BS 110-1. The UE context modification request may include a transmission stop indicator to indicate that source BS 110-1 is to be released from serving UE 120 (e.g., release of a radio link between the source BS 110-1 and the UE 120). In some examples, the source BS 110-1 may provide a downlink data delivery status to CU 502 indicating status of downlink user/control plane duplication the source BS 110-1 is communicating to the UE 120.

In an eleventh communication 555, source BS 110-1 may transmit a UE context modification response to CU 502 in response to the tenth communication 550. For example, the UE context modification response may include an acknowledgement that source BS 110-1 is to be released during the handover procedure and/or is to no longer serve UE 120.

In a twelfth communication 560, the CU 502 may transmit a DL RRC transfer to the target BS 110-2. The DL RRC transfer may include an RRC reconfiguration message indicating that a handover procedure from the source BS 110-1 to the target BS 110-2 is to be performed.

In a thirteenth communication 565, the target BS 110-2 may transmit an RRC reconfiguration to UE 120. In some examples, the RRC reconfiguration message may indicate that UE 120 is to release a connection with the source BS 110-1. As such, UE 120 may release the connection with the source BS 110-1 based at least in part on receiving the RRC reconfiguration message. Furthermore, UE 120 may then begin exchanging uplink user data and downlink user data with CU 502 via target BS 110-2.

In a fourteenth communication 570, the UE 120 may transmit an RRC reconfiguration complete message to the target BS 110-2. The RRC reconfiguration complete message may indicate that UE 120 has released the connection with source BS 110-1.

In a fifteenth communication 575, the target BS 110-2 may transmit a UL RRC transfer to CU 502. In some aspects, the UL RRC transfer may be made in response to the fourteenth communication 570 and may indicate that the RRC reconfiguration complete message was received from UE 120.

In a sixteenth communication 580, the CU 502 may then send a UE context release command to source BS 110-1 (e.g., so that source BS 110-1 does not continue to attempt to serve UE 120).

In a seventeenth communication 585, the source BS 110-1 may transmit a UE context release complete message to CU 502. The UE context release complete message may be an acknowledgement that source BS 110-1 is no longer in communication with and/or serving UE 120. As indicated above, FIG. 5 is provided as an example. Other examples may differ from what is described with respect to FIG. 5.

Example Optimizations for Enhanced Handover Procedures Using Aspects of Conditional Handovers Aspects of the present disclosure relate to wireless communications, and more particularly, to enhanced handover procedures configured to improve make-before-break (MBB) and conditional handover (CHO) procedures. In some cases, the optimization may support MBB and/or CHO procedures involving N2 signaling. In some cases, optimizations may include performing actions to prioritize handover procedures to target BSs that may be able to utilize Xn connections.

N2 signaling generally refers to signaling via the physical N2 interface between the NG-RAN gNB and an access and mobility management function (AMF) in the 5G Core (5GC) network, as well as the logical N1 interface between the UE and the AMF. N2 generally serves as the control plane interface between an access network (NG-RAN or non-3GPP wireless local area network (WLAN)) and the 5GC network. N2 is generally concerned with connection management, UE context and protocol data unit (PDU) session management, and UE mobility management. Xn signaling generally refers to signaling using the Xn interface that exists between base stations (e.g., between gNBs). Xn generally refers to the network interface between NG-RAN nodes.

The techniques presented herein may help provide optimizations to support MBB and CHO for inter-NG RAN handovers. In certain cases of enhanced handover procedures, the source BS and target BS are connected via Xn, which offers a relatively low latency communication interface. In such cases, data forwarding may be communicated over Xn between these nodes. Thus, aspects of the present disclosure may allow N2-based HO procedures to prioritize such nodes to take advantage of lower latency associated with Xn signaling.

Typically, CHO configurations are sent to a UE before an actual HO event. The source BS may prepare one or multiple candidate target cells for CHO. For each candidate target cell, the network (e.g., a source BS and/or a CN) configures the UE with information to allow the UE to connect to the target cell during an HO, and with conditions to trigger the HO to the target cell. When an HO condition is met, the UE initiates a random access procedure (RACH) with the target cell. In such cases, the UE does not need to send a measurement report or wait for RRC Reconfiguration to execute HO.

As noted above, in CHO procedures defined for N2-based candidate cell preparations, source BS may prepare and/or select the candidate cells based on measurement criteria alone. If some of the cells belong to a different AMF, there may be a benefit in optimizing the source BS and UE CHO execution logic to prioritize the cells using the same AMF. In some cases, data forwarding over N2 may benefit from optimizations regarding when to enable the data forwarding for MBB and/or CHO handover procedures.

As discussed, conditional handover (CHO) is a handover procedure in which the UE selects a target cell for handover from among the candidate target cells based on CHO execution criteria. As described herein, the CHO procedure can be implemented for secondary node (SN) addition or change procedures and reduce the delays involved in SN addition or change in dual-connectivity scenarios.

Generally, the MN decides which primary secondary cells (PSCells) to be configured as candidate PSCells, and performs an SN addition procedure with the candidate SNs (Step 2-3). The candidate PSCells may be under the same CU as the MN, or different CUs. However, as described below, the process would be simpler if the MN configures multiple candidate PSCells in one message and includes trigger criteria for SN addition or change in an RRC reconfiguration message sent to the UE to configure the conditional NR PSCells. For example, the RRC reconfiguration message may include: (i) source cell RRC configuration changes (if any), (ii) conditional SN addition or change execution criteria configuration for each candidate PSCell (as configured by source cell), and/or (iii) RRC reconfiguration for each candidate PSCell. Such a messaging scheme would simplify PSCell configuration for handover.

As described further below, it is beneficial to check the validity of the different contents of an RRC reconfiguration message that include conditional PSCell configuration information at different times to reduce RRC reconfiguration processing delays. For example, source cell RRC configuration changes and conditional SN addition or change execution criteria can be validity-checked by the UE immediately after receiving the RRC reconfiguration message because both of these pieces of information are prepared by the MN. If either pieces of information are invalid, the UE may trigger an RRC re-establishment procedure. If the two pieces of information are valid, the UE may send an RRC reconfiguration complete message to the MN. In another example, the validity of an RRC reconfiguration for a candidate PSCell can be checked by the UE after CHO criteria is met for that candidate PSCell. Once the UE has detected that the execution criteria for SN addition or change is met, and, the configuration of the candidate PSCell is valid, the UE may transmit an RRC reconfiguration complete message to the MN indicating which candidate PSCell it selected as the new SN. The MN can inform the selected SN that UE has accepted the SN configuration, and the selected SN can activate or reserve RACH resources for this UE. In addition, or as an alternative, the UE may also send an RRC reconfiguration complete over SRB3 or MAC-CE or PUCCH indication to the target SN to indicate successful completion of SN addition or change.

Figure 6A:
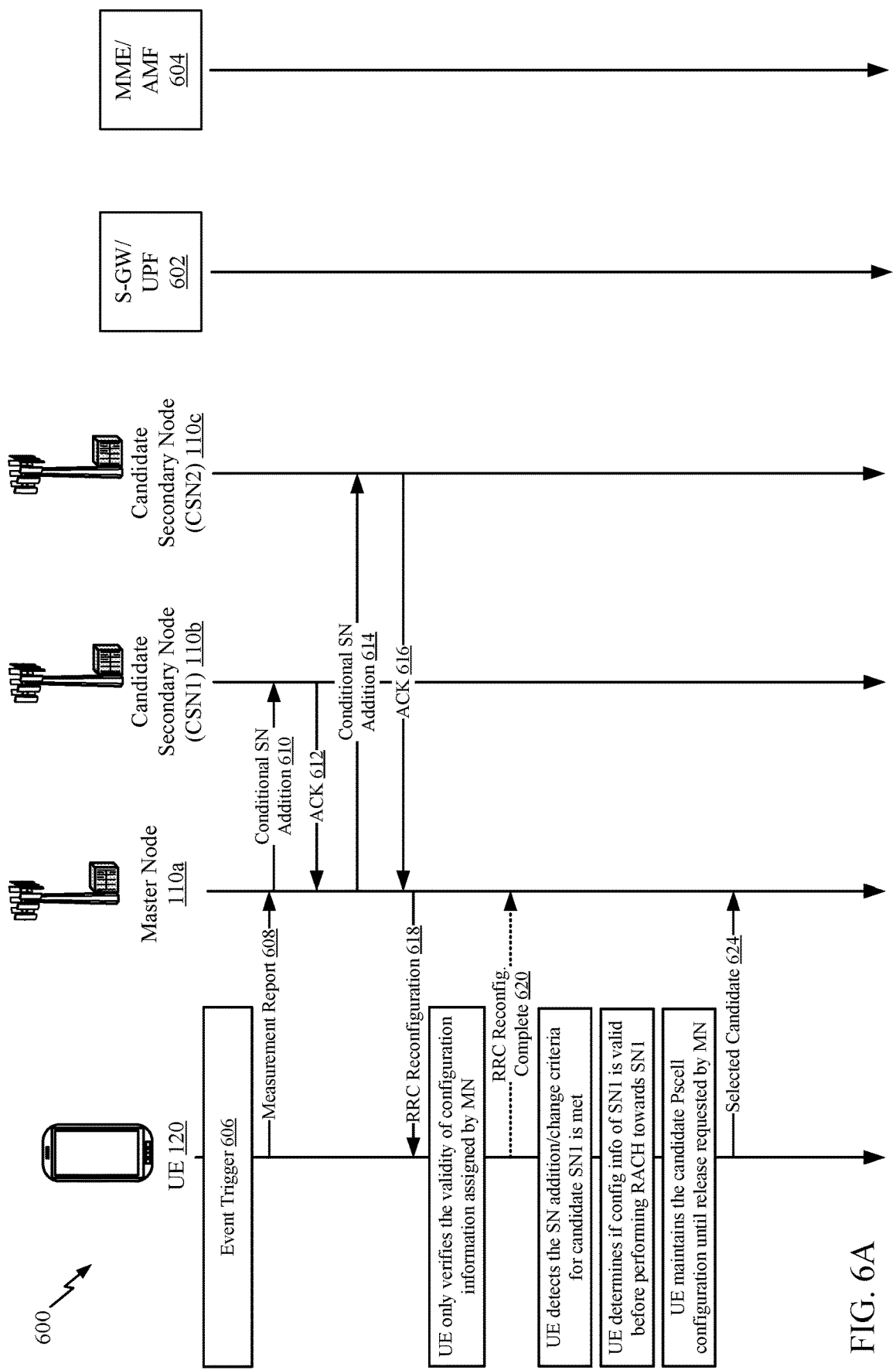
FIGS. 6A and 6B are a single call flow diagram illustrating an example handover (HO) operation between a UE, a master node (MN), candidate secondary nodes (CSNs), and core network functions, in accordance with certain aspects of the present disclosure.
Figure 6B:
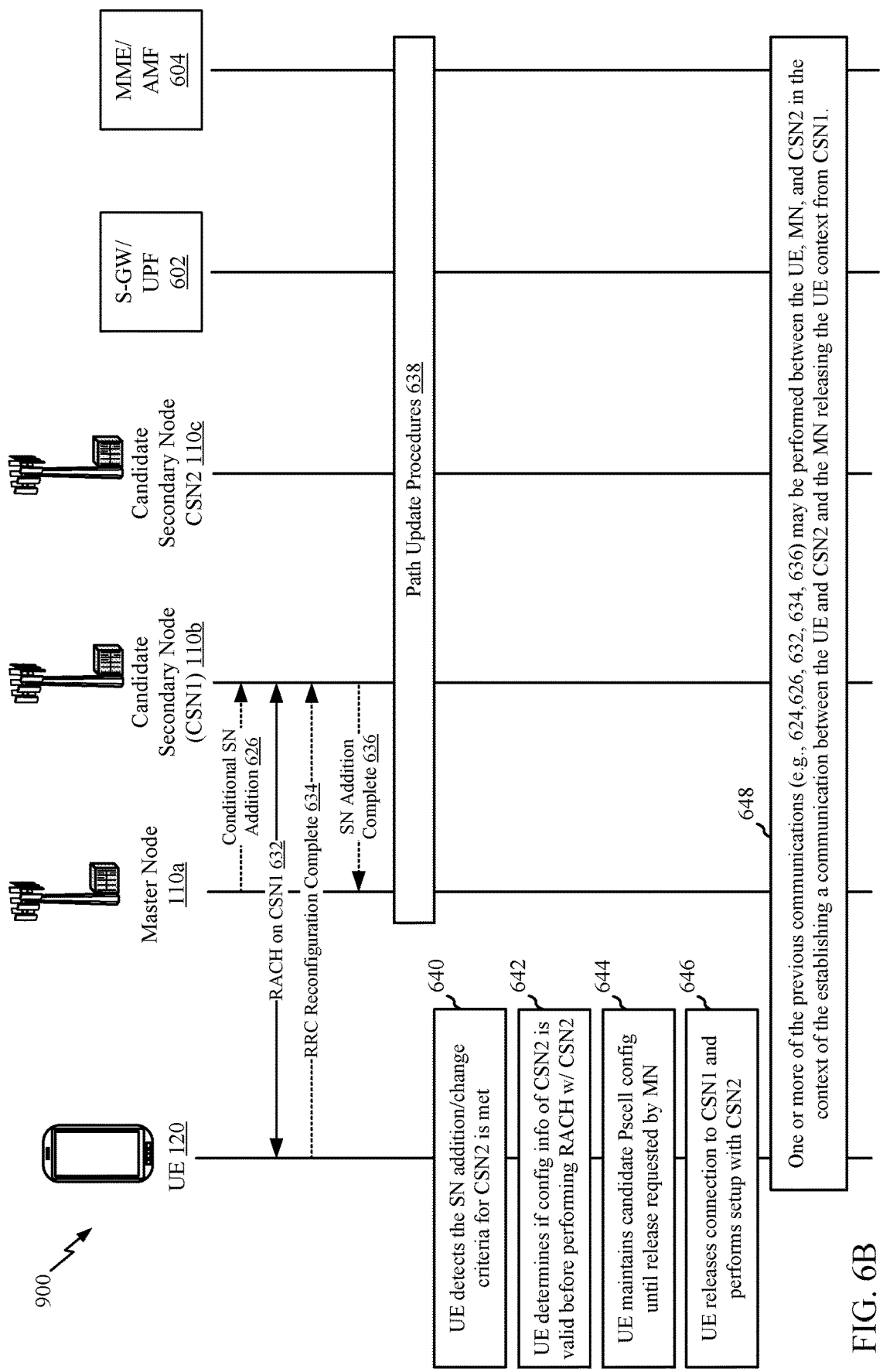

FIGS. 6A and 6B are call-flow diagrams illustrating example signaling 600 for conditional secondary node (SN) addition and change. It should be noted that throughout the disclosure, the SN may be interchangeably referred to as a primary secondary cell (PSCell) (or candidate PSCell), and part of a secondary cell group (SCG). As follows the disclosure describes techniques for conditional NR PSCell addition/change, and reusing conditional handover (CHO) solutions to achieve the conditional NR PSCell addition/change. These techniques can support architecture options including E-UTRAN new radio dual connectivity (EN-DC), E-UTRA-NR dual connectivity (NGEN-DC), and NR-NR dual connectivity (NR-DC), where the PSCell is NR (e.g., gNB), and both intra-SN and inter-SN.

In certain aspects, the techniques described herein reduce interruption time during HO and reduce dual active protocol stack based HO interruption time. In certain aspects, the techniques described herein improve HOs, and SCG change reliability and robustness, by implementing: (i) conditional handover for NR PSCell change, (ii) conditional handover based NR PSCell addition/change for any architecture option with NR PSCell, and (iii) T312 or other suitable timer based fast failure recovery for NR. Certain aspects relate to multi-radio dual connectivity (MR-DC) architecture options where candidate NR PSCells can be added or changed using CHO techniques prior to HO.

In certain aspects, CHO is a HO procedure in which a UE (e.g., UE 120 of FIG. 1) selects a target SN (e.g., a target SN is chosen to which the UE will be handed-over to) from among candidate target cells based on CHO execution criteria. As noted above, using CHO for SN addition/change procedures reduces delays involved conventional SN addition/change during dual-connectivity procedures. In certain aspects, using CHO for SN addition/change can be applied to a variety of MR-DC architectures. For example, EN-DC where the eNB acts as a master node (MN) and the gNB acts as an SN, NGEN-DC where ng-eNB acts as the MN and the gNB acts as the SN, NE-DC where the gNB acts as the MN and ng-eNB that acts as the SN, and NR-DC where a first gNB acts as the MN and a second gNB acts as the SN. Thus in certain aspects, the UE 120 and one or more BSs.

Accordingly, FIGS. 6A and 6B illustrate example procedures corresponding to EN-DC, NGEN-DC and NR-DC. For example, LTE network nodes S-GW/UPF 602 and mobile management entity/access and mobility management function (MME/AMF) 604 correspond to EN-DC examples, as well as X2 signaling (e.g., SgNB addition request, SgNB addition request acknowledge, SgNB reconfiguration complete, RRC signaling message, RRC connection reconfiguration, and RRC connection reconfiguration. The remaining messages can support both NGEN-DC and NR-DC procedures.

Example RRC Message Generation

Referring now to FIG. 6A, upon determination of a triggering event 606, the UE 120 may determine to fallback to communication with the MN 110a (e.g., BS 110a of FIG. 1). For example, a triggering event 606 may include detecting, by the UE 120, a handover failure (e.g., T304 expiry) or a radio link failure (RLF) on an SN connection while the UE 120 is still connected to the MN 110a (e.g., the source cell is active). In this example, the UE 120 may declare RLF on the SN connection and operate using the existing MN 110a connection, but refrain from triggering RRC reestablishment.

Before and during the triggering event 606, the UE 120 may monitor neighboring cells. In the example of FIG. 6A, the neighboring cells include a first candidate secondary node (CSN1) and a second candidate secondary node (CSN2) (e.g., BS 110b and BS 110c, respectively, of FIG. 1). In response to the triggering event 606, the UE 120 may transmit a first communication 608 to the MN 110a, wherein the first communication 608 includes a measurement report identifying the CSN1 110b and CSN2 110c. The measurement report may be generated by the UE 120, and may indicate to the MN 110a that the UE 120 is requesting a CHO to a new or additional SN.

The MN 110a may decide which of the candidate nodes (e.g., CSN1 110b and CSN2 110c) to configure as a new PSCell for the UE 120. In a second communication 610, the MN 110a may initiate a first conditional SN addition procedure with CSN1 110b by transmitting a first conditional SN addition message. In a third communication 614, the MN 110a may initiate a second conditional SN addition procedure with CSN2 110c by transmitting a second conditional SN addition message. In some examples, the second communication 610 and the third communication 614 may include an SN addition request to CSN1 110b and another SN addition request to CSN2 110c, respectively.

In a fourth communication 612 and a fifth communication 616, MN 110a may receive an SN addition acknowledgement transmitted by CSN1 110b and an SN addition ACK transmitted from CSN2 110c in response to the requests, respectfully. In some examples, the candidate SNs may be under the same CU as the MN 110a, or alternatively, under different CUs. The MN 110a may also determine the execution criteria for each candidate SN, wherein the execution criteria provides the criteria by which execution of the addition or change (e.g., HO) of a particular one of CSN1 110b or CSN2 110c is to be performed.

In a sixth communication 618, the MN 110a may transmit an RRC configuration message (e.g., "RRC Reconfiguration message" for NR, or "RRC Connection Reconfiguration message" for EN-DC) to the UE 120. In some examples, the RRC configuration message may configure the UE 120 for multiple candidate SNs in a single message. For example, the RRC configuration message may include configuration information for both CSN1 110b and CSN2 110c. In some examples the RRC configuration message may include one or more of: (i) MN 110a configuration changes (if any), (ii) conditional SN addition/change execution criteria for each candidate SN (configured by MN 110a), and/or (iii) RRC reconfiguration for each CSN (transparent container included by respective SN).

Because processing all the information of the RRC configuration message at once by the UE 120 would require a relatively long time to complete, the UE 120 may selectively processes only certain portions of the RRC configuration message while ignoring or not immediately processing other portions. For example, the UE 120a may only verify the validity of information configured by the MN 110a (e.g., conditional SN addition/change execution criteria for each candidate SN), while not verifying the validity of other information that the MN 110a has not altered (e.g., RRC reconfiguration for each CSN) that is also contained in the RRC configuration message. For example, the RRC configuration message may include candidate SN information (e.g., SN configuration information such as RRC configuration information) which is not altered by the MN 110a or verified by the UE 120. Instead, the UE may verify only the conditional SN addition/change execution criteria for each candidate SN of the RRC configuration message. Here, "conditional SN addition/change execution criteria for each candidate SN" may include information that relates to SCG addition/change triggering condition(s), while the "RRC reconfiguration for each CSN" is not verified by the UE 120 and includes dedicated RRC configurations for each of CSN1 110b and CSN2 110c.

In a seventh communication 620, the UE 120 may optionally transmit an RRC reconfiguration complete message to the MN 110a after verification of the "conditional SN addition/change execution criteria for each candidate SN" portion of the RRC reconfiguration message from the sixth communication 618. Alternatively, if the MN 110a indicates a change to the MN 110a (e.g., an RRC configuration change), then the UE 120 may only send the RRC reconfiguration complete message of the seventh communication 620 if both the "MN 110a configuration changes" and the "conditional SN addition/change execution criteria for each candidate SN" are determined by the UE 120 to be valid. In some examples, instead of transmitting the RRC reconfiguration complete message, the UE 120 may transmit an ACK to the MN 110a to confirm reception and validation of the RRC configuration message. In such examples, MN 110a can rely on L1/L2 ACK from the UE 120 to confirm the reception of the RRC reconfiguration message.

Example RRC Configuration Validity Check

As discussed, if the UE 120 were to validate the entire contents of the RRC reconfiguration message of the sixth communication 618, the validation would result in relatively long processing delays. Accordingly, the UE 120 may check the validity of the contents of the RRC reconfiguration message at different times so as to keep instances of RRC reconfiguration processing delays at a minimum.

In certain aspects, the UE 120 may validate the "MN 110a configuration changes" and the "conditional SN addition/change execution criteria for each candidate SN" contents of the RRC reconfiguration message upon its receipt. It should be noted that these contents are prepared by the MN 110a, and are thus readily verifiable by the UE 120. If the UE 120 determines that these contents are invalid, the UE 120 may trigger an RRC re-establishment procedure. However, if the UE 120a is able to validate these contents of the RRC reconfiguration message, the UE 120 may send either of an RRC reconfiguration complete message or an ACK to the MN 110a.

In certain aspects, the UE 120 may validate the "RRC reconfiguration for each CSN" of the RRC reconfiguration message after CHO criteria (e.g., the criteria indicated by "MN 110a configuration changes" and "conditional SN addition/change execution criteria for each candidate SN") is met for that cell. Once the UE 120 has detected that the execution criteria for SN addition/change is met, and the UE 120 has determined that the RRC configuration of one or more CSNs are valid, UE 120 may select a CSN and transmit an indication of the selected CSN in an eighth communication 624 to the MN 110a.

As noted, the RRC reconfiguration complete message of the seventh communication 620 is optional, as the UE 120 may instead send an ACK to the MN 110a indicating that a portion of the RRC reconfiguration message has been validated. In such a case, the UE 120 may communicate the RRC reconfiguration complete message to the MN 110a in the eighth communication 624. Thus, the UE 120 may select an SN from the CSNs (e.g., CSN1 110b and CSN2 110c), and indicate the selected CSN in the RRC reconfiguration complete message in the eighth communication 624.

Referring now to FIG. 6B, in a ninth communication 626, the MN 110a may optionally transmit a conditional SN addition message to the CSN selected by the UE 120 (e.g., in this example, the UE 120 selected CSN1 110b). The conditional SN addition message may be configured to notify CSN1 110b that CSN1 110b will be involved in a process to make CSN 110b a PSCell for the UE 120.

In a tenth communication 632, CSN1 110b (e.g., the selected SN) and the UE 120 may perform a RACH procedure to establish a radio link. In some examples, CSN1 110b may activate or reserve RACH resources for the UE 120. In an eleventh communication 634, the UE 120 may optionally transmit an RRC reconfiguration complete over a signal radio bearer (e.g., SRB3), MAC-CE, or PUCCH to the selected CSN 110b indicating successful completion of SN addition/change. In response to a successful completion of SN addition/change, CSN1 110b, in a twelfth communication 636, may transmit an SN addition/change complete message to the MN 110a.

In subsequent communications 638, the master node 110a, CSN1 110b, CSN2 110c, S-GW/UPF 602, and MME/AMF 604 may perform processes and any necessary communications to update a communication path of the UE 120 to include the communication path established by the RACH procedure of the tenth communication 632.

In another example, the UE 120 may switch back to communication with CSN2 110c from CSN1 110b. For example, in a first process 640, the UE 120 detects that the SN addition/change criteria for CSN2 110c is met. In a second process 642, the UE 120 determines if configuration info of CSN2 110c that the UE 120 maintained is valid before performing a RACH procedure with CSN2 110c. In a third process 644, the UE can maintain candidate Pscell configuration information (e.g., configuration information for CSN1 110b and/or CNS2 110c) until release requested by MN 110a. In a fourth process 646, the UE 120 releases its connection to CSN1 110b and performs path setup with CSN2 110c. In subsequent communications and processes 648, the UE 120, the master node 110a, CSN1 110b, CSN2 110c, S-GW/UPF 602, and MME/AMF 604 may performed the foregoing processes and communication in the context of establishing a communication between the UE 120 and CSN2 110c, and the MN 110a releasing the UE 120 context from CSN1 110b.

Accordingly, the UE 120 supports checking validity of RRC reconfiguration (e.g., "RRCReconfiguration") and RRC connection reconfiguration (e.g., "RRCConnectionReconfiguration") messages during conditional NR PSCell addition/change procedures. In some examples, the UE 120 checks the validity of MN 110a RRC configuration and conditional PSCell addition/change execution criteria configuration upon receiving the conditional PSCell addition/change RRC reconfiguration message including these configuration details. In some examples, the UE 120 triggers RRC re-establishment when any of the MN RRC configuration and conditional PSCell addition/change execution criteria configuration is invalid.

In certain aspects, the UE 120 checks the validity of conditional PSCell RRC reconfiguration only for a PSCell after the conditional PSCell addition/change execution criteria is met for that PSCell. In some examples, the UE triggers RRC re-establishment when the RRC configuration of a PSCell for which conditional PSCell addition/change execution criteria is met is invalid.

In some examples, the UE 120 sends an RRC reconfiguration complete message indicating the selected candidate PSCell Cell group ID to the MN 110*a*, when the execution criteria for conditional PSCell addition/change is met and the configuration of the selected PSCell is valid.

Examples of Conditional PSCell Configuration Maintenance

As the UE 120 continues operating with MN 110*a* during an MR-DC procedure, the UE 120 may not release the conditional PSCell configuration after performing a conditional SN addition/change. For example, in certain aspects of MR-DC SN addition/change procedures, the MN 110*a* connection with the UE 120 is maintained and the MN 110*a* controls the configuration of the SN addition/change.

When the execution criteria for conditional PSCell addition/change is met for a candidate PSCell (e.g., CSN1 110*b* and/or CSN2 110*c* of FIGS. 6A and 6B), the UE 120 may perform SN addition/change procedure towards the candidate PSCell if the UE 120 determines that the RRC configuration message (e.g., the sixth communication 618 of FIG. 6A) is valid. In some examples, the UE 120 does not release the conditional PSCell configuration and continues monitoring the execution criteria, even after successful completion of SN addition/change procedure. In some examples, the UE 120 may suspend monitoring the execution criteria for other PSCells during the execution of PSCell addition/change. In some examples, the UE follows the MN 110*a* commands to configure/reconfigure/release the candidate PSCells from the conditional NR PSCell addition/change configuration.

After the conditional PSCell addition/change is successful, the UE 120 may continue monitoring any other candidate PSCells. When the execution criteria for SN change is met for any of the other PSCells, the UE 120 may release the current PSCell before starting SN change procedure with the candidate PSCell similar to the existing MR-DC procedures. Thus, similar to MR-DC SN change procedures, the UE 120 may release the existing PSCell connection, while performing conditional PSCell change procedure towards a candidate PSCell.

Example Conditional PSCell Addition/Change Execution Criteria Configuration

As discussed above, the UE 120 can be configured with conditional PSCell execution criteria for SN addition and change procedures. The measurement events used to trigger a PSCell addition vs PSCell change may differ based on the type of dual connectivity architecture. Moreover, measurement events may be independently configured by the MN 110*a* and the SN (e.g., CSN1 110*b* and/or CSN2 110*c* of FIGS. 6A and 6B). Thus, the conditional PSCell addition/change RRC message (e.g., the sixth communication 618 of FIG. 6A) has to support configuring separate execution criteria configuration for each PSCell of a plurality of PSCells to allow the UE 120 to perform PSCell addition and/or PSCell change. Accordingly, the MN 110*a* may configure separate execution criteria for conditional PSCell addition and conditional PSCell change in the RRC reconfiguration message sent by the MN 110*a* to the UE 120.

In preparation for the PSCell addition procedure, MN 110*a* may configure the UE 120 with execution criteria for each PSCell the UE 120 monitors. In case of NGEN-DC and EN-DC, an LTE MN 110*a* may configure inter-RAT measurement event criteria similar to a B1 event (e.g., when the UE determines that an inter-RAT neighbor cell or candidate cell signaling quality is greater than a threshold configured at the UE 120 by the MN 110*a*) to determine when/which PSCell to add. Similarly, for conditional NR PSCell addition procedure preparation, MN 110 may configure the UE with B1-like conditional PSCell addition execution criteria.

For example, if the UE 120 is connected to a particular cell, and a neighbor cell which is not in the same RAT (inter-RAT), the UE 120 may utilize an inter-RAT measurement (e.g., a reference signal received power (RSRP) measurement, a reference signal received quality (RSRQ) measurement, a signal to interference noise ratio (SINR) measurement, and/or any other suitable measurement) to determine if the quality of the neighbor cell is greater than a threshold of an execution criteria that the MN 110*a* sends to the UE 120. If the UE determines that the quality is greater than the threshold, then the execution criteria is met. For CHO, instead of the UE 120 sending the measurement report to the MN 110*a*, the UE will determine that the execution criteria (e.g., the B1 event criteria) for the candidate PSCell is met, and the UE 120 will perform the handover to the candidate PSCell. That is, the MN 110*a* may provide the UE 120 with execution criteria for each inter-RAT candidate cell of one or more inter-RAT candidate cells, telling the UE 120 that once a corresponding criteria is met (e.g., once the quality is better than a certain threshold), the UE 120 can perform a handover to the candidate cell. Thus, the UE 120 may monitor each inter-RAT candidate cell provided by the MN 110*a* to determine whether they meet the execution criteria for handover.

In case of NR-DC, both the MN and the candidate SN will be NR nodes (e.g., intra-RAT), thus A3/A5 event execution criteria may be configured at the UE 120 by the MN 110*a*. Thus, in certain aspects, the MN 110*a* and the UE 120 support use of B1-like execution criteria for conditional NR PSCell addition execution condition in case of EN-DC and NGEN-DC, and, A3/A5-like execution criteria for NR-DC.

In certain aspects, the SN change procedures in case of EN-DC, NGEN-DC and NR-DC can be triggered by both the MN 110*a* and the SN (e.g., CSN1 110*b*). For SN changes triggered by the SN 110*b*, a radio resource management (RRM) measurement configuration is maintained by the SN 110*b* which also processes measurement reporting. For example, for the SN 110*b* to perform a conditional PSCell addition or change, the SN 110*b* may send an RRC reconfiguration message over SRB3 with the conditional NR PSCell change execution criteria. In this example, MN 110*a* may not configure PSCell change execution criteria and instead, only configure PSCell addition execution criteria. As such, the UE 120 may rely on the specific SN configured conditional PSCell change execution criteria to decide when to change the PSCell, if not configured by MN 110*a*. If configured by both MN 110*a* and the SN 110*b*, UE 120 considers the MN 110*a* configuration criteria with priority over the SN 110*b* when both are met, or alternatively, the UE 120 may consider the first met criteria.

After the SN 110*b* receives the measurement results (e.g., results of measurements according to the execution criteria, performed and transmitted to the SN 110*b* by the UE 120), the SN 110*b* may transmit a message to the MN 110*a* indicating a change request that includes the measurement results for the candidate SN 110*b*. In response, the MN 110*a* may then decide whether to accept or refuse the SN 110*b* initiated SN change procedure, and then proceed to perform the SN change procedure with the candidate SN and the UE 120 accordingly.

Considering that MN 110*a* has control over the SN change procedures as well, it may be preferable in some cases to allow the MN 110*a* to configure the SN change execution criteria and not support SN configuring the conditional PSCell change execution criteria. For example, MN 110*a* and SN may coordinate to determine the conditional PSCell change execution criteria, but MN 110*a* may send the RRC reconfiguration message to the UE 120 with the conditional PSCell change execution criteria determined by the MN 110*a*. In case of EN-DC, NGEN-DC, NR-DC, the candidate SN 110*b* belongs to the NR network, and the measurement events used for configuring the conditional NR PSCell change execution criteria are A3/A5-like criteria. Thus, the MN 110*a* and/or SN may use A3/A5-like execution criteria for conditional NR PSCell change execution condition in case of EN-DC, NGEN-DC, and, NR-DC.

Figure 7:
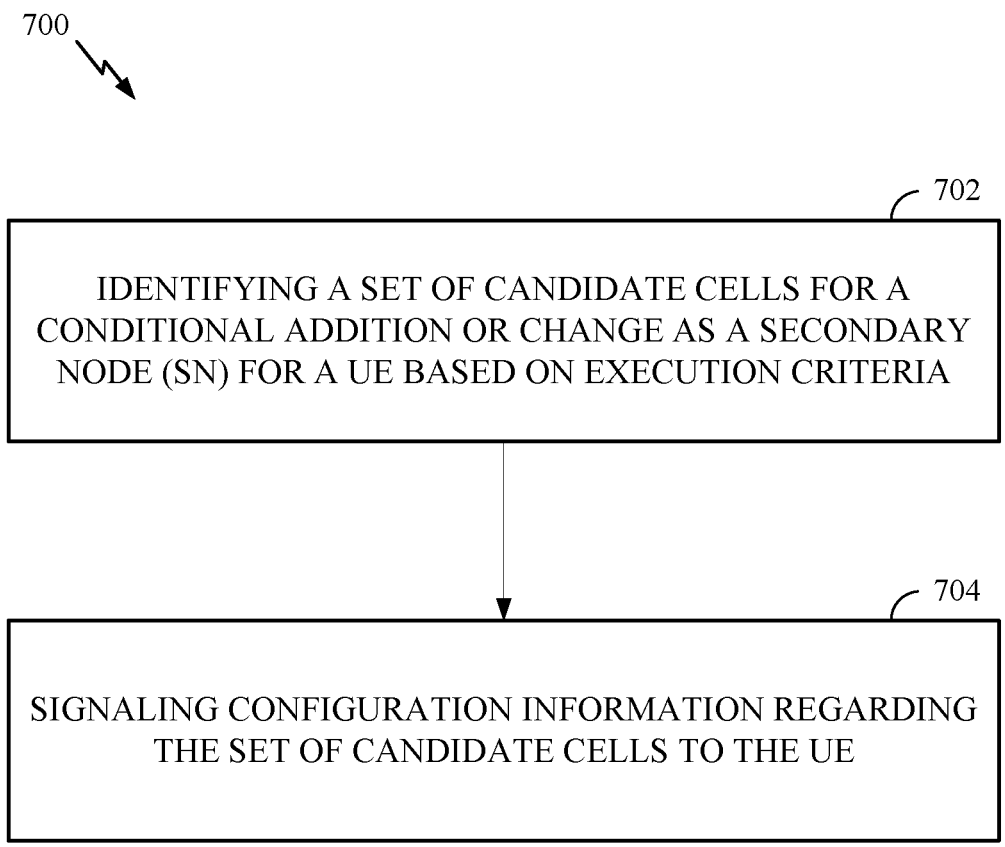
FIG. 7 is a flow diagram illustrating an example operation for HO by a MN, in accordance with certain aspects of the present disclosure.
Figure 8:
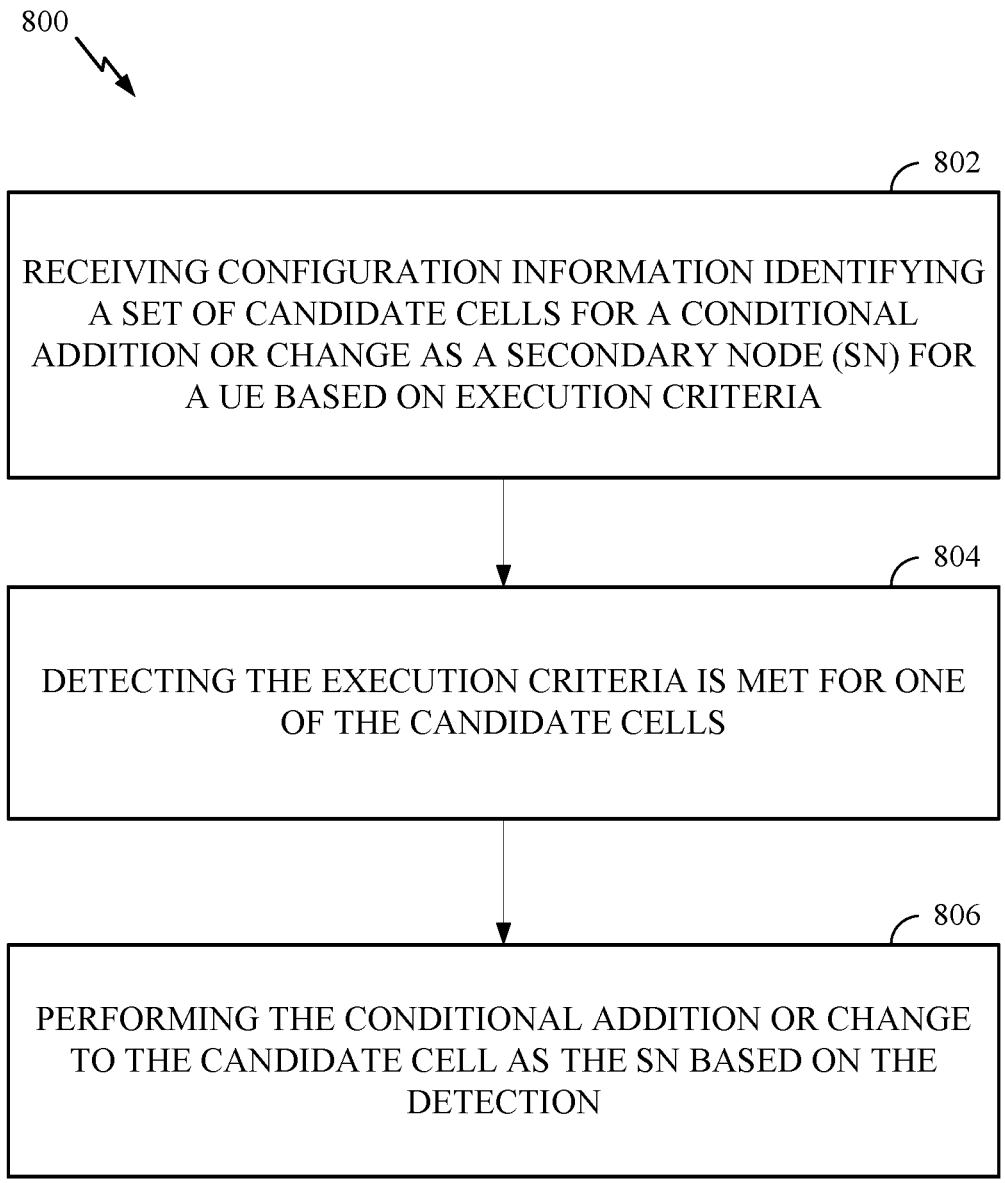
FIG. 8 is a flow diagram illustrating an example operation for HO by a UE, in accordance with certain aspects of the present disclosure.
Figure 9:
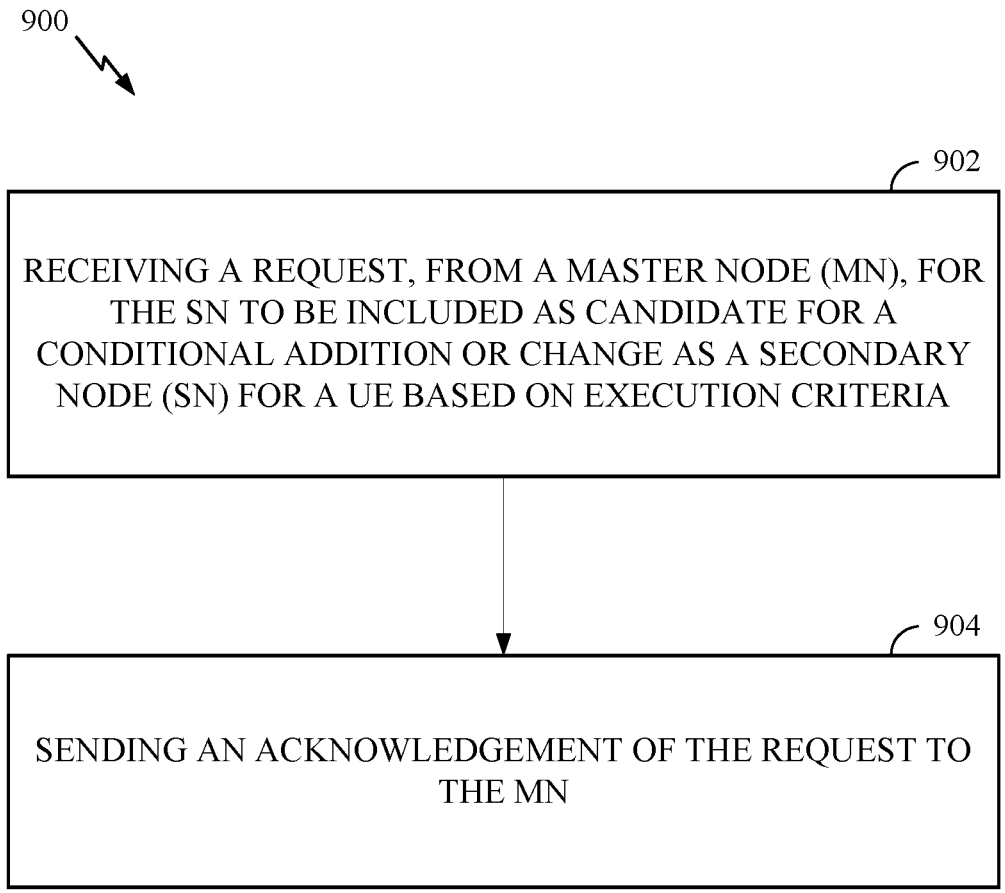
FIG. 9 is a flow diagram illustrating an example operation for HO by a secondary node (SN), in accordance with certain aspects of the present disclosure.

FIGS. 7-9 are flow diagrams that illustrate example operations that may be performed by a source base station (e.g., source gNB or master node 110*a* of FIGS. 6A and 6B), a UE (e.g., UE 120 of FIGS. 6A and 6B), and core network entity (e.g., MME/AMF 604 of FIGS. 6A and 6B), to optimize/improve enhanced handover procedures, such as MBB HO and CHO.

FIG. 7 illustrates example operations 700 for wireless communication, in accordance with certain aspects of the present disclosure. The operations 700 may be performed, for example, by a source BS, PCell, or master node (MN) (e.g., such as MN 110*a* of FIGS. 6A and 6B). The operations 700 may be complimentary to the operations 800 performed by a UE and/or operations 900 performed by a secondary node, as discussed with respect to FIGS. 8 and 9 below. Operations 700 may be implemented as software components that are executed and run on one or more processors (e.g., controller/processor 340 of FIG. 3). Further, the transmission and reception of signals by the MN in operations 700 may be enabled, for example, by one or more antennas (e.g., antennas 334 of FIG. 3). In certain aspects, the transmission and/or reception of signals by the MN may be implemented via a bus interface of one or more processors (e.g., controller/processor 340) obtaining and/or outputting signals.

Operations 700 begin, at 702, by identifying a set of candidate cells for a conditional addition or change as a secondary node (SN) for a UE based on execution criteria. At 704, the MN signals configuration information regarding the set of candidate cells to the UE.

In certain aspects, further comprising performing an SN addition procedure with each of the candidate cells and the UE.

In certain aspects, the configuration information is signaled to the UE in a radio resource control (RRC) message.

In certain aspects, the RRC message comprises an RRC reconfiguration message if the MN is a new radio (NR) MN; or an RRC connection reconfiguration message if the MN is a long term evolution (LTE) MN.

In certain aspects, the RRC reconfiguration message includes at least one of the following information for conditional addition or change of an SN: source cell RRC configuration changes of the MN; conditional SN addition or change execution criteria configuration for each candidate cell in the set; or RRC reconfiguration information for each candidate cell in the set of candidate cells.

In certain aspects, the operations 700 further comprise receiving a radio resource control (RRC) message from the UE indicating when the execution criteria for the conditional SN addition or change is met for a selected one of the candidate cells in the set if a configuration of the selected one of the candidate cells is valid.

In certain aspects, the RRC message comprises an RRC reconfiguration complete message if the MN is a new radio (NR) MN; or an RRC connection reconfiguration complete message if the MN is a long term evolution (LTE) MN.

In certain aspects, the configuration information is signaled to the UE in a radio resource control (RRC) message that includes separate execution criteria for the conditional addition or change of an SN.

In certain aspects, the execution criteria for conditional SN addition involve inter-RAT measurement events configured to indicate whether: a measured signal quality value of at least one inter-RAT neighbor is greater than a first threshold value; or a measured signal quality value of a Pcell is less than the first threshold value, and the measured signal quality value of the at least one inter-RAT neighbor is greater than a second threshold value.

In certain aspects, the execution criteria for conditional SN addition involve intra-RAT measurement events configured to indicate whether: an offset of at least one intra-RAT neighbor is greater than an offset of a PCell; or a measured signal quality value of a PCell is less than a first threshold value, and the measured signal quality value of the at least one intra-RAT neighbor is greater than a second threshold value.

In certain aspects, the execution criteria for conditional SN change involve intra-RAT measurement events configured to indicate whether: an offset of at least one intra-RAT neighbor is greater than an offset of a PSCell; or a measured signal quality value of a PSCell is less than a first threshold value, and the measured signal quality value of the at least one intra-RAT neighbor is greater than a second threshold value.

In certain aspects, the configuration information is signaled to the UE in a radio resource control (RRC) message that includes separate execution criteria for different candidate cells.

FIG. 8 illustrates example operations 800 for wireless communication, in accordance with certain aspects of the present disclosure. The operations 800 may be performed, for example, by a UE (e.g., such as UE 120 of FIGS. 6A and 6B). The operations 800 may be complimentary to the operations 700 performed by a MN and/or operations 900 performed by a secondary node, as discussed with respect to FIG. 7 above and FIG. 9 below. Operations 800 may be implemented as software components that are executed and run on one or more processors (e.g., controller/processor 380 of FIG. 3). Further, the transmission and reception of signals by the UE in operations 800 may be enabled, for example, by one or more antennas (e.g., antennas 352 of FIG. 3). In certain aspects, the transmission and/or reception of signals by the MN may be implemented via a bus interface of one or more processors (e.g., controller/processor 380) obtaining and/or outputting signals.

Operations 800 begin, at 802, by receiving configuration information identifying a set of candidate cells for a conditional addition or change as a secondary node (SN) for a UE based on execution criteria. At 804, the UE detects the execution criteria is met for one of the candidate cells. At 806, the UE takes action to add or change to the candidate cell as an SN based on the detection.

In certain aspects, the configuration information is signaled to the UE in a radio resource control (RRC) message.

In certain aspects, the RRC message comprises: an RRC reconfiguration message if the MN is a new radio (NR) MN; or an RRC connection reconfiguration message if the MN is a long term evolution (LTE) MN.

In certain aspects, the RRC reconfiguration message includes one or more of the following information for conditional addition or change of an SN: RRC configuration changes of the MN; conditional SN addition or change execution criteria configuration for each candidate cell in the set; or RRC reconfiguration information for each candidate cell in the set of candidate cells.

In certain aspects, the UE checks the validity of the configuration information and execution criteria upon its receipt.

In certain aspects, the UE checks the validity of the configuration information and execution criteria for a cell after detecting the execution criteria for that cell is met.

In certain aspects, the operations 800 further comprise sending a radio resource control (RRC) message to the MN indicating when the execution criteria for the conditional SN addition or change is met for a selected one of the candidate cells in the set if a configuration of the selected one of the candidate cells is valid.

In certain aspects, the RRC message comprises an RRC reconfiguration complete message if the MN is a new radio (NR) MN; or an RRC connection reconfiguration complete message if the MN is a long term evolution (LTE) MN.

In certain aspects, the UE performs one or more of the following procedures when the execution criteria for the one of the candidate cells is met: performing an SN addition or change procedure with the one of the candidate cells if the configuration for that cell is valid; maintaining a conditional configuration for other of the candidate cells and continuing monitoring of execution criteria, of the other of the candidate cells after successful completion of the SN addition or change procedure; suspending monitoring of the execution criteria for the other of the candidate cells while performing the SN addition or change procedure; and following MN commands to at least one of configure, reconfigure, or release the candidate cells from the conditional SN addition or change configuration.

In certain aspects, the UE releases an existing SN connection while performing a conditional SN change procedure to the one of the candidate cells.

In certain aspects, the configuration information is signaled to the UE in a radio resource control (RRC) message that includes separate execution criteria for the conditional addition or change of an SN.

In certain aspects, the execution criteria for conditional SN addition involve inter-RAT measurement events configured to indicate whether: a measured signal quality value of at least one inter-RAT neighbor is greater than a first threshold value; or a measured signal quality value of a PCell is less than the first threshold value, and the measured signal quality value of the at least one inter-RAT neighbor is greater than a second threshold value.

In certain aspects, the execution criteria for conditional SN addition involve intra-RAT measurement events configured to indicate whether: an offset of at least one intra-RAT neighbor is greater than an offset of an PCell; or a measured signal quality value of the PCell is less than a first threshold value, and the measured signal quality value of the at least one intra-RAT neighbor is greater than a second threshold value.

In certain aspects, the execution criteria for conditional SN change involve intra-RAT measurement events configured to indicate whether: an offset of at least one intra-RAT neighbor is greater than an offset of an PSCell; or a measured signal quality value of the PSCell is less than a first threshold value, and the measured signal quality value of the at least one intra-RAT neighbor is greater than a second threshold value.

In certain aspects, the configuration information is signaled to the UE in a radio resource control (RRC) message that includes separate execution criteria for different candidate cells.

In certain aspects, the UE is further configured to refrain from stopping a MN timer or a first candidate PSCell timer and starting a second candidate PSCell timer upon receiving the configuration information identifying the set of candidate cells for the conditional addition or change.

In certain aspects, the UE is further configured to: start the second candidate PSCell timer upon initiation of the execution of conditional addition; and stop the first candidate PSCell timer and start the second candidate PSCell timer upon initiation of the execution of the conditional change.

In certain aspects, the UE is further configured to determine a failure of the execution of the conditional addition or change; report the failure of the execution of the conditional addition or change to a master node (MN); and refrain from initiating a re-establishment procedure due to the failure.

In certain aspects, the UE is further configured to determine a success of the execution of the conditional addition or change towards a candidate PSCell; report the subsequent failure of the connected candidate PSCell to a master node (MN); and refrain from initiating a re-establishment procedure on detecting a failure of the candidate PSCell.

FIG. 9 illustrates example operations 900 for wireless communication, in accordance with certain aspects of the present disclosure. The operations 900 may be performed, for example, by a secondary node (SN) (e.g., such as CSN1 110b and/or CSN2 110c of FIGS. 6A and 6B). The operations 900 may be complimentary to the operations 700 performed by a MN and/or operations 800 performed by a UE, as discussed with respect to FIGS. 7 and 8 above. Operations 900 may be implemented as software components that are executed and run on one or more processors (e.g., controller/processor 340 of FIG. 3). Further, the transmission and reception of signals by the SN in operations 900 may be enabled, for example, by one or more antennas (e.g., antennas 334 of FIG. 3). In certain aspects, the transmission and/or reception of signals by the SN may be implemented via a bus interface of one or more processors (e.g., controller/processor 340) obtaining and/or outputting signals.

Operations 900 begin, at 902, by receiving a request, from a master node (MN), for the SN to be included as candidate for a conditional addition or change as an SN for a UE based on execution criteria. At 904, the SN sends an acknowledgement of the request to the MN.

In certain aspects, the operations 900 further comprise: receiving, from the MN, an indication generated by the UE that the execution criteria for the conditional addition or change of the SN has been met.

In certain aspects, the operations 900 further comprise: receiving a first message from the UE confirming conditional addition of the SN; and transmitting a second message to the MN indicating completion of a conditional SN addition.

Figure 10:
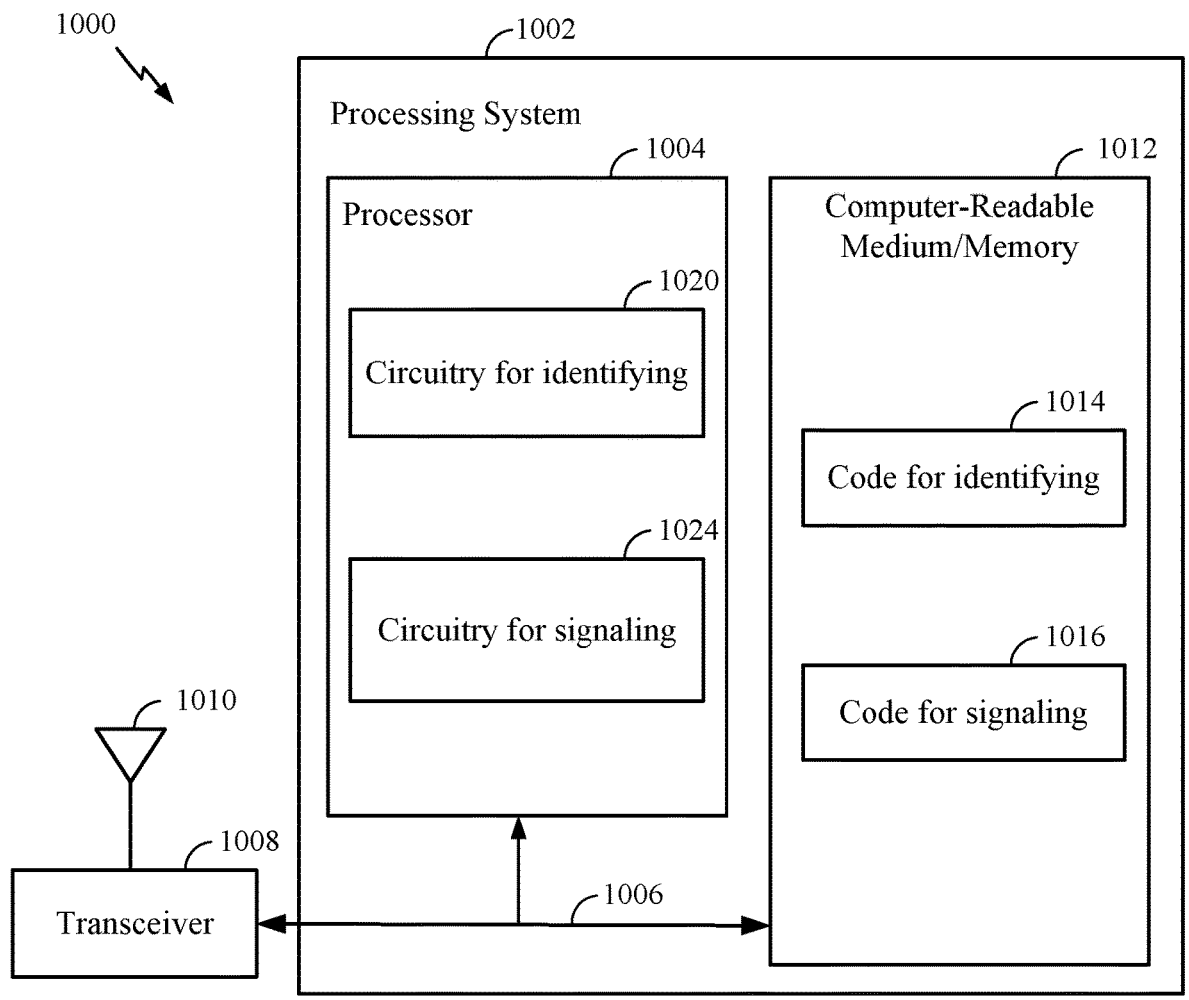
FIGS. 10-12 are block diagrams illustrating communications devices that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein. In certain aspects, computer-readable medium/memory 1012 stores code 1014 for identifying a set of candidate cells for a conditional addition or change as a secondary node (SN) for a UE based on execution criteria, and code 1016 for signaling configuration information regarding the set of candidate cells to the UE. In certain aspects, the processor 1004 has circuitry configured to implement the code stored in the computer-readable medium/memory 1012. The processor 1004 includes circuitry 1020 for identifying a set of candidate cells for a conditional addition or change as a secondary node (SN) for a UE based on execution criteria, and circuitry 1024 for signaling configuration information regarding the set of candidate cells to the UE.

Figure 11:
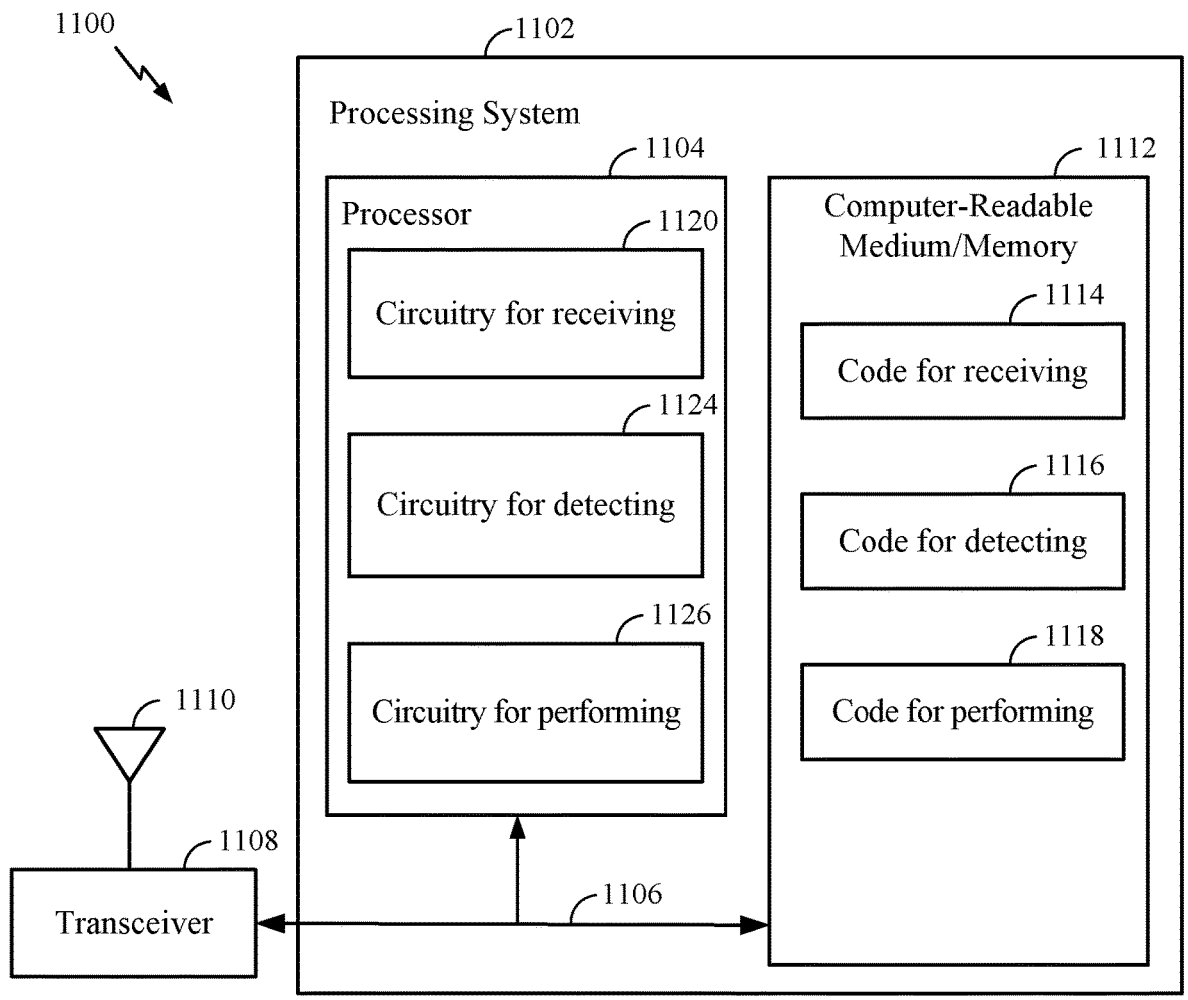

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein. In certain aspects, computer-readable medium/memory 1112 stores code 1114 for receiving configuration information identifying a set of candidate cells for a conditional addition or change as a secondary node (SN) for a UE based on execution criteria; code 1116 for detecting the execution criteria is met for one of the candidate cells; and code 1118 for performing the conditional addition or change to the one of the candidate cells as the SN based on the detection. In certain aspects, the processor 1104 has circuitry configured to implement the code stored in the computer-readable medium/memory 1112. The processor 1104 includes circuitry 1120 for receiving configuration information identifying a set of candidate cells for a conditional addition or change as a secondary node (SN) for a UE based on execution criteria; circuitry 1124 for detecting the execution criteria is met for one of the candidate cells; and circuitry 1126 for performing the conditional addition or change to the one of the candidate cells as the SN based on the detection.

Figure 12:
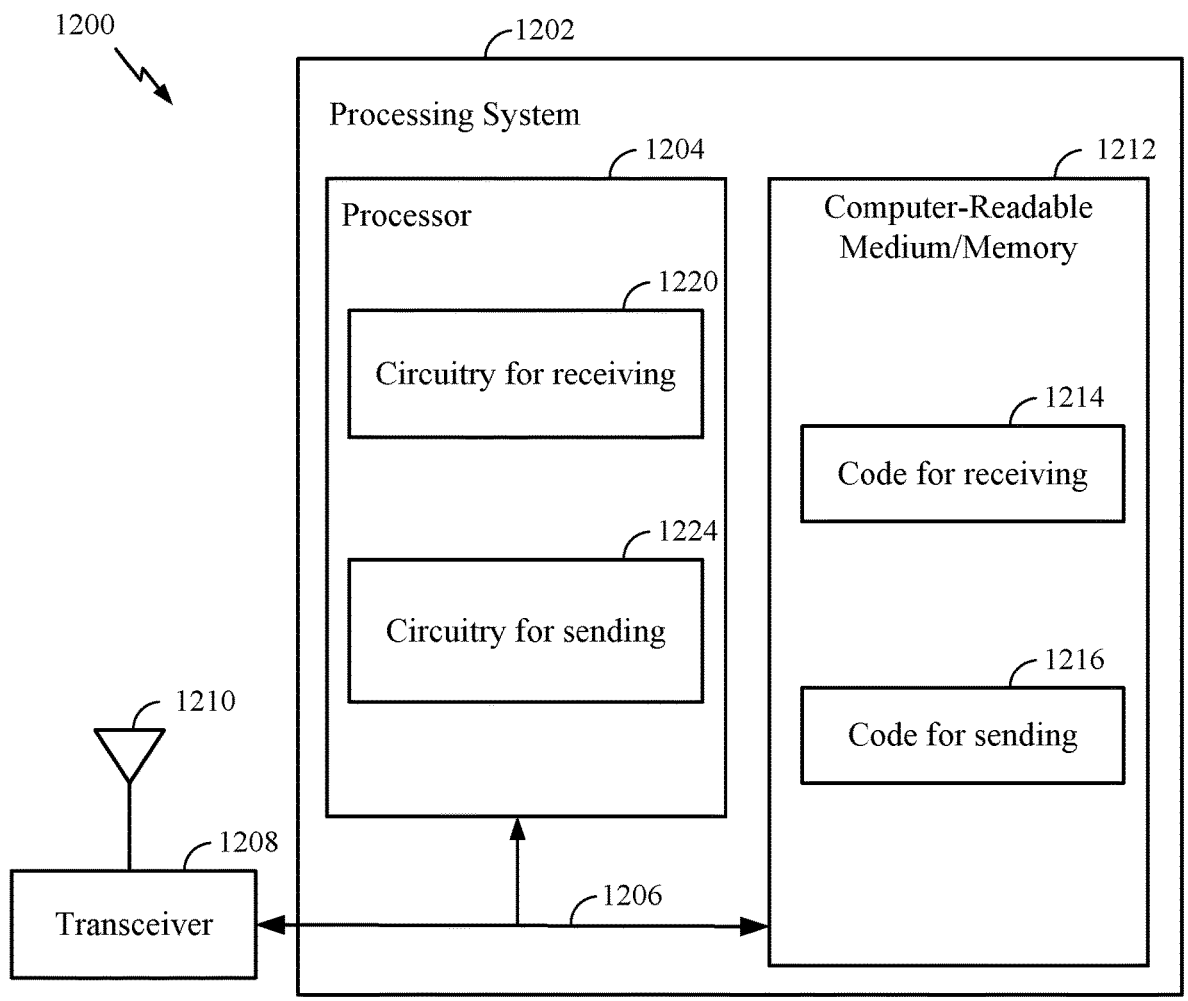

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein. In certain aspects, computer-readable medium/memory 1212 stores code 1214 for receiving a request, from a master node (MN), for the SN to be included as candidate for a conditional addition or change as an SN for a UE based on execution criteria; and code 1216 for sending an acknowledgement of the request to the MN. In certain aspects, the processor 1204 has circuitry configured to implement the code stored in the computer-readable medium/memory 1212. The processor 1204 includes circuitry 1220 for receiving a request, from a master node (MN), for the SN to be included as candidate for a conditional addition or change as an SN for a UE based on execution criteria; and circuitry 1224 for sending an acknowledgement of the request to the MN.

EXAMPLE EMBODIMENTS

Embodiment 1: A method for wireless communications by a master node (MN), comprising: identifying a set of candidate cells for a conditional addition or change as a secondary node (SN) for a UE based on execution criteria; and signaling configuration information regarding the set of candidate cells to the UE.

Embodiment 2: The method of Embodiment 1, further comprising performing an SN addition procedure with each of the candidate cells and the UE.

Embodiment 3: The method of Embodiments 1 or 2, wherein the configuration information is signaled to the UE in a radio resource control (RRC) message.

Embodiment 4: The method of Embodiment 3, wherein the RRC message comprises: an RRC reconfiguration message if the MN is a new radio (NR) MN; or an RRC connection reconfiguration message if the MN is a long term evolution (LTE) MN.

Embodiment 5: The method of any of Embodiments 1-4, wherein the RRC reconfiguration message includes one or more of the following information for the conditional addition or change of an SN: an RRC configuration change at the MN; conditional SN addition or change execution criteria configuration for each candidate cell in the set; or RRC reconfiguration information for each candidate cell in the set of candidate cells.

Embodiment 6: The method of any of Embodiments 1-5, further comprising receiving a radio resource control (RRC)

message from the UE indicating when the execution criteria for the conditional SN addition or change is met for a selected one of the candidate cells in the set if a configuration of the selected one of the candidate cells is valid.

Embodiment 7: The method of any of Embodiments 1-6, wherein the RRC message comprises: an RRC reconfiguration complete message if the MN is a new radio (NR) MN; or an RRC connection reconfiguration complete message if the MN is a long term evolution (LTE) MN.

Embodiment 8: The method of any of Embodiments 1-7, wherein the configuration information is signaled to the UE in a radio resource control (RRC) message that includes separate execution criteria for the conditional addition or change of an SN.

Embodiment 9: The method of any of Embodiments 1-8, wherein the execution criteria for conditional SN addition involve inter-RAT measurement events configured to indicate whether: a measured signal quality value of at least one inter-RAT candidate cell is greater than a first threshold value; or a measured signal quality value of a PCell is less than the first threshold value, and the measured signal quality value of the at least one inter-RAT candidate cell is greater than a second threshold value.

Embodiment 11: The method of any of Embodiments 1-10, wherein the execution criteria for conditional SN change comprises intra-RAT measurement events configured to indicate whether: an offset of at least one intra-RAT candidate cell is greater than an offset of a PSCell; or a measured signal quality value of the PSCell is less than a first threshold value, and the measured signal quality value of the at least one intra-RAT candidate cell is greater than a second threshold value.

Embodiment 12: The method of any of Embodiments 1-11, wherein the execution criteria for conditional SN addition involve intra-RAT measurement events configured to indicate whether: an offset of at least one intra-RAT neighbor is greater than an offset of an PCell; or a measured signal quality value of the PCell is less than a first threshold value, and the measured signal quality value of the at least one intra-RAT neighbor is greater than a second threshold value.

Embodiment 13: The method of any of Embodiments 1-12, wherein the execution criteria for conditional SN change involve intra-RAT measurement events configured to indicate whether: an offset of at least one intra-RAT candidate cell is greater than an offset of an PSCell; or a measured signal quality value of the PSCell is less than a first threshold value, and the measured signal quality value of the at least one intra-RAT candidate cell is greater than a second threshold value.

Embodiment 14: The method of any of Embodiments 1-13, wherein the configuration information is signaled to the UE in a radio resource control (RRC) message that includes separate execution criteria for each candidate cell in the set of candidate cells.

Embodiment 15: A method for wireless communications by a user equipment (UE), comprising: receiving configuration information identifying a set of candidate cells for a conditional addition or change as a secondary node (SN) for a UE based on execution criteria; detecting the execution criteria is met for one of the candidate cells; and taking action to perform the conditional addition or change to the candidate cell as the SN based on the detection.

Embodiment 16: The method of Embodiment 15, wherein the configuration information is signaled to the UE in a radio resource control (RRC) message from one of a master node (MN) or a secondary node (SN).

Embodiment 17: The method of any of Embodiments 15 or 16, wherein the RRC message comprises: an RRC reconfiguration message if the MN is a new radio (NR) MN; or an RRC connection reconfiguration message if the MN is a long term evolution (LTE) MN.

Embodiment 18: The method of any of Embodiments 15-17, wherein the RRC reconfiguration message includes at least one of the following information for conditional addition or change of an SN: source cell RRC configuration changes; conditional SN addition or change execution criteria configuration for each candidate cell in the set; or RRC Reconfiguration for each candidate cell in the set.

Embodiment 19: The method of any of Embodiments 15-18, wherein the UE checks the validity of the configuration information and execution criteria upon its receipt.

Embodiment 20: The method of any of Embodiments 15-19, wherein the UE checks the validity of the configuration information and execution criteria for a cell after detecting the execution criteria for that cell is met.

Embodiment 21: The method of any of Embodiments 15-20, further comprising sending a radio resource control (RRC) message to the MN indicating when the execution criteria for the conditional SN addition or change is met for a selected one of the candidate cells in the set if a configuration of the selected one of the candidate cells is valid.

Embodiment 22: The method of any of Embodiments 15-21, wherein the RRC message comprises: an RRC reconfiguration complete message if the MN is a new radio (NR) MN; or an RRC connection reconfiguration complete message if the MN is a long term evolution (LTE) MN.

Embodiment 23: The method of any of Embodiments 15-22, wherein the UE performs one or more of the following procedures when the execution criteria for the one of the candidate cells is met: performing an SN addition or change procedure with the one of the candidate cells if the configuration for that cell is valid; maintaining a conditional configuration for other of the candidate cells and continuing monitoring of execution criteria, of the other of the candidate cells after successful completion of the SN addition or change procedure; suspending monitoring of the execution criteria for the other of the candidate cells while performing the SN addition or change procedure; and following MN commands to at least one of configure, reconfigure, or release the candidate cells from the conditional SN addition or change configuration.

Embodiment 24: The method of any of Embodiments 15-23, wherein the UE releases an existing SN connection while performing a conditional SN change procedure to the one of the candidate cells.

Embodiment 25: The method of any of Embodiments 15-24, wherein the configuration information is signaled to the UE in a radio resource control (RRC) message that includes separate execution criteria for the conditional addition or change of an SN.

Embodiment 26: The method of any of Embodiments 15-25, wherein the execution criteria for conditional SN addition involve at least one of inter-RAT or intra-RAT measurement events configured to indicate whether: a measured signal quality value of at least one inter-RAT neighbor is greater than a first threshold value; or; an offset of at least one intra-RAT neighbor cell is greater than an offset of an PCell; or a measured signal quality value of a PCell is less than the first threshold value, and the measured signal quality value of the at least one inter-RAT or intra-RAT neighbor is greater than a second threshold value.

Embodiment 27: The method of any of Embodiments 15-26, wherein the execution criteria for conditional SN change involve intra-RAT measurement events configured to indicate whether: an offset of at least one intra-RAT candidate cell is greater than an offset of an PSCell; or a measured signal quality value of the PSCell is less than a first threshold value, and the measured signal quality value of the at least one intra-RAT candidate cell is greater than a second threshold value.

Embodiment 28: The method of any of Embodiments 15-27, wherein the configuration information is signaled to the UE in a radio resource control (RRC) message that includes separate execution criteria for each candidate cell in the set of candidate cells.

Embodiment 29: A method for wireless communications by a secondary node (SN), comprising: receiving a request, from a master node (MN), for the SN to be included as candidate for a conditional addition or change as an SN for a UE based on execution criteria; and sending an acknowledgement of the request to the MN.

Embodiment 30: The method of Embodiment 29, further comprising: receiving, from the MN, an indication generated by the UE that the execution criteria for the conditional addition or change of the SN has been met.

Embodiment 31: The method of any of Embodiments 29 or 30, further comprising: receiving a message from the UE confirming conditional addition of the SN; and sending a conditional SN addition complete message to the MN.

Embodiment 32: The method of any of Embodiments 29-31, wherein the UE is further configured to: refrain from stopping a MN timer or a first candidate PSCell timer and starting a second candidate PSCell timer upon receiving the configuration information identifying the set of candidate cells for the conditional addition or change.

Embodiment 33: The method of any of Embodiments 29-32, wherein the UE is further configured to: start the second candidate PSCell timer upon initiation of the execution of conditional addition; and stop the first candidate PSCell timer and start the second candidate PSCell timer upon initiation of the execution of the conditional change.

Embodiment 34: The method of any of Embodiments 29-33, wherein the UE is further configured to: determine a failure of the execution of the conditional addition or change; report the failure of the execution of the conditional addition or change to a master node (MN); and refrain from initiating a re-establishment procedure due to the failure.

Embodiment 35: The method of any of Embodiments 29-34, wherein the UE is further configured to: determine a success of the execution of the conditional addition or change towards a candidate PSCell; report the subsequent failure of the connected candidate PSCell to a master node (MN); and refrain from initiating a re-establishment procedure on detecting a failure of the candidate PSCell.

Embodiment 36: A master node (MN), comprising a memory; and a processor communicatively coupled to the memory, the processor and the memory configured to: identify a set of candidate cells for a conditional addition or change as a secondary node (SN) for a UE based on execution criteria; and signal configuration information regarding the set of candidate cells to the UE.

Embodiment 37: The MN of Embodiment 36, wherein the processor and the memory are further configured to perform an SN addition procedure with each of the candidate cells and the UE.

ADDITIONAL CONSIDERATIONS

It should be noted that certain aspects of the disclosure relate to 3rd Generation Partnership Project (3GPP) specification no. 38.331, section 5.5.4, and is incorporated herein by reference.

Agreements made on conditional HO for NR PCell change in several RAN2 meetings are provided in Appendix A. Considering that procedures for conditional PSCell addition/change shown in FIG. 8.

In certain aspects, conditional NR PSCell addition/change is defined as UE having network configuration for initiating access to a candidate PSCell, either to consider the PSCell as suitable for SN addition or SN change, based on configured condition(s).

In certain aspects, usage of conditional NR PSCell addition/change is decided by network. UE evaluates when the condition is valid.

In certain aspects, the baseline operation for conditional NR PSCell addition/change procedure assumes the RRC reconfiguration message contains SCG addition/change triggering condition(s) and dedicated RRC configuration(s). UE accesses the prepared PSCell when the relevant condition is met.

In certain aspects, the MN decides on the condition for the execution of conditional SN addition/change.

In certain aspects, the MN adds the condition for the execution of conditional SN addition/change to the RRC message sent to UE.

In certain aspects, multiple candidate PSCells can be sent in either one or multiple RRC messages.

In certain aspects, conditional PSCell addition/change execution does not trigger measurement report.

In certain aspects, an RRC container is used to carry PSCell configuration to the UE, and MN is not allowed to alter any content of configuration from the PSCell.

In certain aspects, the MN and/or SN may use add/mod list and release list to configure multiple candidate PSCells.

In certain aspects, conditional PSCell addition/change execution condition can be updated by modifying the existing Conditional PSCell addition/change configuration, PSCell configuration can be updated by modifying the existing conditional PSCell addition/change configuration.

In certain aspects, the MN and/or SN may reuse the RRCReconfiguration/RRCConnectionReconfiguration procedure to signal Conditional PSCell addition/change configuration to UE.

In certain aspects, after conditional PSCell addition/change configuration has been sent to the UE, MN configuration can be updated.

In certain aspects, separate conditional NR PSCell addition/change execution condition(s) can be configured for each individual candidate PSCells.

In certain aspects, the measurement identity which identifies a measurement configuration defines an execution condition.

In certain aspects, cell level quality is used as baseline for conditional NR PSCell addition/change execution condition. For example, only single reference signal (RS) type (synchronization signal block (SSB) or channel state information reference signal (CSI-RS)) per candidate PSCell is supported. In another example, a baseline conditional NR PSCell addition/change can be triggered based on a condition consisting of a single event, single RS type, single quantity. In another example, allow multiple triggering conditions for conditional NR PSCell addition/change execution of a single candidate PSCell. In some examples, at most two triggering quantities (e.g. two of reference signal received power (RSRP), signal reference signal received quality (RSRQ), and signal-to-noise and interference ratio (SINR), etc.) can be configured simultaneously. In some examples, time-to-trigger (TTT) is supported for conditional NR PSCell addition/change execution condition (as per legacy configuration).

In certain aspects, no additional optimizations are introduced to improve RACH performance for conditional PSCell addition/change completion with multi-beam operation.

For FR1 and FR2, leave it up to UE implementation to select the candidate PSCell if more than one candidate cell meets the triggering condition.

In certain aspects, the UE is not required to continue evaluating the triggering condition of other candidate PSCell(s) during conditional SN execution.

In certain aspects, RAN2 assumes late packet forwarding (i.e. not done immediately when the candidate PSCells become prepared) could be suitable for Conditional NR PSCell addition/change when there are multiple candidate PSCells. Early packet forwarding can also be considered, and, is up to RAN3 study.

In certain aspects, support Conditional PSCell addition/change for MR-DC architecture options of EN-DC, NGEN-DC and NR-DC, where gNB is the SN.

In certain aspects, UE supports below RRCReconfiguration/RRCConnectionReconfiguration message validity check behavior during Conditional NR PSCell addition/change procedures: (i) UE checks the validity of MN RRC Configuration and conditional PSCell addition/change execution criteria configuration immediately on receiving the conditional PSCell addition/change RRC Reconfiguration message including these configuration details. For example, UE triggers RRC Re-establishment when any of the MN RRC Configuration and conditional PSCell addition/change execution criteria configuration is invalid.

In certain aspects, UE checks the validity of conditional PSCell RRC Reconfiguration only for a PSCell after the conditional PSCell addition/change execution criteria is met for that PSCell.

In certain aspects, UE triggers RRC Re-establishment when the RRC configuration of a PSCell for which conditional PSCell addition/change execution criteria is met is invalid.

In some examples, the UE 120 sends an RRC reconfiguration complete message indicating the selected candidate PSCell Cell group ID to the MN 110a, when the execution criteria for conditional PSCell addition/change is met and the configuration of the selected PSCell is valid.

In certain aspects, when the execution criteria for conditional PSCell addition/change is met for a candidate PSCell, the UE performs SN addition/change procedure towards the candidate PSCell if configuration is valid.

In certain aspects, UE does not release the conditional PSCells configuration and continues monitoring the execution criteria, even after successful completion of SN addition/change procedure.

In certain aspects, UE may suspend monitoring the execution criteria for other PSCells during the execution of PSCell addition/change.

In certain aspects, UE follows the MN commands to configure/reconfigure/release the candidate PSCells from the conditional NR PSCell addition/change configuration.

In certain aspects, similar to MR-DC SN change procedures, the UE releases the existing PSCell connection, while performing conditional PSCell change procedure towards a candidate PSCell.

In certain aspects, the UE, MN, and SN support configuring separate execution criteria for conditional NR PSCell addition and conditional NR PSCell change, in the RRC Reconfiguration message sent by the MN to the UE.

In certain aspects, the UE, MN, and SN support use of B1-like execution criteria for conditional NR PSCell addition execution condition in case of EN-DC and NGEN-DC, and, A3/A5-like execution criteria for NR-DC.

In certain aspects, the UE, MN, and SN support use of A3/A5-like execution criteria for conditional NR PSCell change execution condition in case of EN-DC, NGEN-DC, and, NR-DC.

In certain aspects, conditional NR PSCell addition/change is defined as UE having network configuration for initiating access to a candidate PSCell, either to consider the PSCell as suitable for SN addition or SN change, based on configured condition(s).

In certain aspects, usage of conditional NR PSCell addition/change is decided by network. UE evaluates when the condition is valid.

In certain aspects, the UE, MN, and SN support configuration of one or more candidate cells for conditional NR PSCell addition/change;

In certain aspects, the MN decides on the condition for the execution of conditional SN addition/change.

In certain aspects, the MN adds the condition for the execution of conditional SN addition/change to the RRC message sent to UE.

In certain aspects, multiple candidate PSCells can be sent in either one or multiple RRC messages.

In certain aspects, conditional PSCell addition/change execution does not trigger measurement report.

As part of conditional PSCell addition/change configuration to be sent to the UE, RRC container is used to carry PSCell configuration and MN is not allowed to alter any content of configuration from the PSCell.

In certain aspects, conditional PSCell addition/change execution condition can be updated by modifying the existing Conditional PSCell addition/change configuration, PSCell configuration can be updated by modifying the existing Conditional PSCell addition/change configuration.

In certain aspects, the SN and MN are configured to reuse the RRCReconfiguration/RRCConnectionReconfiguration procedure to signal Conditional PSCell addition/change configuration to UE.

In certain aspects, after Conditional PSCell addition/change configuration has been sent to the UE, MN configuration can be updated.

In certain aspects, separate conditional NR PSCell addition/change execution condition(s) can be configured for each individual candidate PSCells.

In certain aspects, the UE, MN, or SN are configured to define a execution condition by the measurement identity which identifies a measurement configuration.

In certain aspects, cell level quality is used as baseline for Conditional NR PSCell addition/change execution condition.

In certain aspects, only single RS type (SSB or CSI-RS) per candidate PSCell is supported.

Certain aspects provide for having multiple triggering conditions for Conditional NR PSCell addition or change execution of a single candidate PSCell.

In certain aspects, at most two triggering quantities (e.g. RSRP and RSRQ, RSRP and SINR, etc.) can be configured simultaneously FFS on UE capability.

In certain aspects, TTT is supported for Conditional NR PSCell addition/change execution condition (as per legacy configuration).

In certain aspects, no additional optimizations are introduced to improve RACH performance for conditional PSCell addition or change completion with multi-beam operation.

In certain aspects, for FR1 and FR2, UE implementation may determine which of the candidate PSCells to select if more than one candidate cell meets the triggering condition.

In certain aspects, the UE is not required to continue evaluating the triggering condition of other candidate PSCell(s) during conditional SN execution.

In certain aspects, RAN2 assumes late packet forwarding (i.e. not done immediately when the candidate PSCells become prepared) could be suitable for Conditional NR PSCell addition/change when there are multiple candidate PSCells. Early packet forwarding can also be considered, and, is up to RAN3 study.

In certain aspects, in MR-DC, a master cell group (MCG) is a group of serving cells associated with the MN, comprising the SpCell (Pcell) and optionally one or more Scells. Here a PCell is an SpCell of a master cell group; A PSCell is a SpCell of a secondary cell group. In MR-DC, a secondary cell group (SCG) is a group of serving cells associated with the SN, comprising of the SpCell (PSCell) and optionally one or more Scells. Here, an SpCell is a primary cell of an MCG or an SCG.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized. It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications by a user equipment (UE), comprising:
   one or more processors configured to execute instructions stored on one or more memories and to cause the UE to:
      receive configuration information identifying a set of candidate cells for a conditional secondary node (SN) change procedure;
      detect that one or more trigger conditions for the conditional SN change procedure are satisfied for a first candidate cell of the set of candidate cells, wherein the one or more trigger conditions for the conditional SN change procedure are different from one or more trigger conditions for a conditional SN addition procedure; and
      perform the conditional SN change procedure with the first candidate cell based on the detection that the one or more trigger conditions for the conditional SN change procedure are satisfied.

2. The apparatus of claim 1, wherein the one or more processors are further configured to cause the UE to start a second candidate PSCell timer upon receiving the configuration information identifying the set of candidate cells for the conditional SN change procedure.

3. The apparatus of claim 2, wherein the one or more processors are configured to cause the UE to start the second candidate PSCell timer while a master node (MN) timer is running.

4. The apparatus of claim 1, wherein the one or more processors are configured to cause the UE to receive the configuration information in a radio resource control (RRC) message from one of an MN or an SN.

5. The apparatus of claim 4, wherein the RRC message comprises:
   an RRC reconfiguration message if the MN is a new radio (NR) MN; or
   an RRC connection reconfiguration message if the MN is a long term evolution (LTE) MN.

6. The apparatus of claim 5, wherein the RRC reconfiguration message includes one or more of the following information for the conditional SN change procedure:

RRC configuration changes of the MN;
an execution criteria configuration for each candidate cell in the set of candidate cells; or
RRC reconfiguration information for each candidate cell in the set of candidate cells.

7. The apparatus of claim 6, wherein the one or more processors are further configured to cause the UE to check validity of the RRC reconfiguration information for the first candidate cell after detecting that the one or more trigger conditions for conditional SN change procedure for the first candidate cell are satisfied.

8. The apparatus of claim 1, wherein the one or more processors are further configured to cause the UE to check validity of the configuration information and the one or more trigger conditions.

9. The apparatus of claim 1, wherein the one or more processors are further configured to cause the UE to send a radio resource control (RRC) message to a MN indicating when the one or more trigger conditions for the conditional SN change procedure are satisfied for the first candidate cell and when a configuration of the first candidate cell is valid.

10. The apparatus of claim 9, wherein the RRC message comprises:
an RRC reconfiguration complete message if the MN is a new radio (NR) MN; or
an RRC connection reconfiguration complete message if the MN is a long term evolution (LTE) MN.

11. A method for wireless communications by a user equipment (UE), comprising:
receiving configuration information identifying a set of candidate cells for a conditional secondary node (SN) change procedure;
detecting that one or more trigger conditions for the conditional SN change procedure are satisfied for a first candidate cell of the set of candidate cells, wherein the one or more trigger conditions for the conditional SN change procedure are different from one or more trigger conditions for a conditional SN addition procedure; and
performing the conditional SN change procedure with the first candidate cell based on the detection that the one or more trigger conditions for the conditional SN change procedure are satisfied.

12. The method of claim 11, further comprising starting a second candidate PSCell timer upon receiving the configuration information identifying the set of candidate cells for the conditional SN change procedure.

13. The method of claim 12, wherein starting the second candidate PSCell timer comprises starting the second candidate PSCell timer while a master node (MN) timer is running.

14. The method of claim 11, wherein receiving the configuration information comprises receiving the configuration information in a radio resource control (RRC) message from one of an MN or an SN.

15. The method of claim 14, wherein the RRC message comprises:
an RRC reconfiguration message if the MN is a new radio (NR) MN; or
an RRC connection reconfiguration message if the MN is a long term evolution (LTE) MN.

16. The method of claim 15, wherein the RRC reconfiguration message includes one or more of the following information for the conditional SN change procedure:
RRC configuration changes of the MN;
an execution criteria configuration for each candidate cell in the set of candidate cells; or
RRC reconfiguration information for each candidate cell in the set of candidate cells.

17. The method of claim 16, further comprising checking validity of the RRC reconfiguration information for the first candidate cell after detecting that the one or more trigger conditions for conditional SN change procedure for the first candidate cell are satisfied.

18. The method of claim 11, further comprising checking validity of the configuration information and the one or more trigger conditions.

19. The method of claim 11, further comprising sending a radio resource control (RRC) message to a MN indicating when the one or more trigger conditions for the conditional SN change procedure are satisfied for the first candidate cell and when a configuration of the first candidate cell is valid.

20. A non-transitory computer-readable medium for wireless communications by a user equipment (UE), comprising:
instructions that, when executed by one or more processors of the UE, cause the UE to:
receive configuration information identifying a set of candidate cells for a conditional secondary node (SN) change procedure;
detect that one or more trigger conditions for the conditional SN change procedure are satisfied for a first candidate cell of the set of candidate cells, wherein the one or more trigger conditions for the conditional SN change procedure are different from one or more trigger conditions for a conditional SN addition procedure; and
perform the conditional SN change procedure with the first candidate cell based on the detection that the one or more trigger conditions for the conditional SN change procedure are satisfied.

* * * * *